US011790129B2

(12) United States Patent
Rezgui

(10) Patent No.: US 11,790,129 B2
(45) Date of Patent: *Oct. 17, 2023

(54) VIRTUALIZATION, VISUALIZATION AND AUTONOMOUS DESIGN AND DEVELOPMENT OF OBJECTS

(71) Applicant: AZ, LLC, San Francisco, CA (US)

(72) Inventor: Sana Rezgui, San Francisco, CA (US)

(73) Assignee: AZ, LLC, San Francisco, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/166,585

(22) Filed: Feb. 3, 2021

(65) Prior Publication Data
US 2021/0157960 A1  May 27, 2021

Related U.S. Application Data

(63) Continuation of application No. 15/818,580, filed on Nov. 20, 2017, now Pat. No. 10,943,036, which is a continuation-in-part of application No. 15/449,789, filed on Mar. 3, 2017, now Pat. No. 10,152,462.

(60) Provisional application No. 62/425,011, filed on Nov. 21, 2016, provisional application No. 62/305,437, filed on Mar. 8, 2016.

(51) Int. Cl.
*G06F 30/20* (2020.01)
*G06T 19/00* (2011.01)
*G06F 30/39* (2020.01)
*G06F 40/103* (2020.01)
*G06F 40/137* (2020.01)

(52) U.S. Cl.
CPC .............. *G06F 30/20* (2020.01); *G06F 30/39* (2020.01); *G06F 40/103* (2020.01); *G06F 40/137* (2020.01); *G06T 19/006* (2013.01)

(58) Field of Classification Search
CPC ........ G06F 30/20; G06F 30/39; G06F 40/103; G06F 40/137; G06T 19/006
USPC ...................................... 703/13, 20
See application file for complete search history.

(56) References Cited

U.S. PATENT DOCUMENTS 5,708,825 A  1/1998  Sotomayor
5,905,654 A  5/1999  Tanino et al.
(Continued)

OTHER PUBLICATIONS

Notice of Allowance dated Oct. 14, 2021 in U.S. Appl. No. 16/181,158, 12 pages.
(Continued)

*Primary Examiner* — Andre Pierre Louis

(57) ABSTRACT

An integrated platform is provided that enables the various steps of development operations from design to sales, the virtualization, the visualization and the interpretation of a device so it may be fully created (designed), viewed, manipulated, packaged, simulated, tested, published and marketed right from within the platform. The resulting virtual device (VD) may be a multi-layered, -dimensional, -angular, -disciplinary, -documentarian, -service, manipulated and used in multiple ways. The provided VD may include visual representations of the VD via a traditional display device in a non-immersive environment and/or within an immersive environment via new virtual-reality (VR) devices. For instance, a user may create, manipulate, in real-time, layered multi-dimensional views of a VD in a virtual-reality, augmented-reality (AR), augmented virtual-reality (AVR), and/or mixed-reality (MR) environments.

20 Claims, 7 Drawing Sheets

(56) References Cited

U.S. PATENT DOCUMENTS

| | | |
|---|---|---|
| 7,117,453 B2 | 10/2006 | Drucker et al. |
| 8,065,606 B1 | 11/2011 | Gralnick et al. |
| 8,810,583 B2 | 8/2014 | Kang et al. |
| 9,026,915 B1 | 5/2015 | Ehlen et al. |
| 10,041,992 B2 | 8/2018 | Rezgui |
| 10,528,684 B1 * | 1/2020 | Ayubi-Moak ........... G06F 30/39 |
| 2001/0032248 A1 | 10/2001 | Krafchin |
| 2001/0049596 A1 | 12/2001 | Lavine et al. |
| 2002/0156803 A1 | 10/2002 | Maslov et al. |
| 2002/0184267 A1 | 12/2002 | Nakao |
| 2003/0208502 A1 | 11/2003 | Lin |
| 2003/0217330 A1 | 11/2003 | Shelley |
| 2006/0197764 A1 | 9/2006 | Yang |
| 2006/0217979 A1 | 9/2006 | Pahud et al. |
| 2007/0094251 A1 | 4/2007 | Lu et al. |
| 2008/0172616 A1 | 7/2008 | Harrington et al. |
| 2009/0113289 A1 | 4/2009 | Zhang et al. |
| 2009/0150364 A1 | 6/2009 | Melander et al. |
| 2013/0205202 A1 | 8/2013 | Xiao et al. |
| 2014/0013192 A1 | 1/2014 | McQuiggan et al. |
| 2014/0282324 A1 | 9/2014 | Greiner et al. |
| 2015/0033116 A1 | 1/2015 | McKinney et al. |
| 2015/0134600 A1 | 5/2015 | Eisner et al. |
| 2016/0277715 A1 | 9/2016 | Mankovskii et al. |
| 2018/0188901 A1 * | 7/2018 | Shtuchkin .............. G06Q 10/10 |

OTHER PUBLICATIONS

Cirulis, A., and Ginters, E., "Visualization Techniques for Simulation Models in Virtual Reality", Proceedings of the European Modeling and Simulation Symposium, pp. 530-535 (2014).

Final Office Action dated Mar. 12, 2021 in U.S. Appl. No. 16/181,158, 13 pages.

* cited by examiner

VIRTUALIZATION, VISUALIZATION AND AUTONOMOUS DESIGN AND DEVELOPMENT OF OBJECTS

CROSS REFERENCE TO RELATED APPLICATIONS

This application is a Continuation of U.S. patent application Ser. No. 15/818,580, filed Nov. 20, 2017, which is itself a Continuation-in-part of U.S. patent application Ser. No. 15/449,789, filed Mar. 3, 2017, and issued as U.S. Pat. No. 10,152,462. U.S. patent application Ser. No. 15/818,580 also claims the benefit of U.S. Provisional Application No. 62/425,011 filed Nov. 21, 2016. The entire contents of each of the foregoing applications are incorporated by reference herein in their entirety.

U.S. patent application Ser. No. 15/449,789 itself also claims the benefit of U.S. Provisional Patent Application No. 62/425,011, filed on Nov. 21, 2016, and U.S. Provisional Patent Application No. 62/305,437 filed Mar. 8, 2016, the entire contents of each of the foregoing applications are incorporated by reference herein.

BACKGROUND

Various Electronic Design Automation (EDA) & Computer-Aided Design (CAD) tools (e.g., TCAD™, Virtuoso™, Synplify™, ModelSim™, and LTSpice™) were built for the enablement of design and simulation of Integrated Circuits (ICs). Because of the very stringent high-performance requirements imposed on them (smaller memory utilizations, faster execution times, etc.), each one of these tools was built to fulfill a specific task and none of them provided the full symbolic representation of an IC. Additionally, none of them was built to autonomously design, manufacture and/or productize an IC from scratch programmatically and/or autonomously without having been explicitly programmed to do so. Similarly, most of the chipmakers' companies are comprised of various well-defined engineering groups: Process, Device, Design, Architecture, Software, Packaging, Production, Manufacturing, Technical-Support, Marketing, and/or Sales, where each one of these groups is dedicated to a given task. However, due to the complexities of these conventional tools, some users may not utilize the full complement of requirements to build, maintain, market and sell an IC. Such knowledge is usually based on personal and great individual and/or teamwork expertise passed on from one engineer/team to another and is often treated as proprietary information. This information may not be contained in a single platform that shows and/or allows the viewing of the full extent of the engineering work involved in building an IC.

Furthermore, nowadays circuits are quite complex and are in most cases System on Chip (SoC) or System in Package (SiP) solutions. Each one of them encapsulates millions of transistors and various sub-circuits, include many process-layers and have unique & intricate layouts. These conventional tools may be based on, or at least rely on, terabytes of device/circuit databases & libraries that are spread out over various references (books, journals, web-links, etc.). Such information is often inaccessible to most and in some cases never been recorded. The collection, translation, interpretation and representation of these data are quite tedious and require special expertise in the Electrical Engineering (EE), Computer Science and Software Engineering subjects. Without insight, help or guidance, most EE scholars and consumers (students, company interns, engineers, chipmakers & designers, scientists, etc.) may struggle and be overwhelmed with the complexities of those architectures and the amount of information to comprehend often in very short times. Consequently, progress may be degraded, and performance & productivity diminished and their overall deliveries delayed.

SUMMARY

Embodiments herein include an integrated tool or platform that can facilitate the creation, the virtualization, the visualization (display, projection), and the understanding of semiconductor devices (diodes, transistors, ICs) on a given platform and in assisted and interactive manners, while being accessible to users, through the web, the cloud, or generally networked user computing devices. As used herein, embodiments of this tool or platform may be referred to as a Virtual Device & Circuit (VD&C) tool. This tool enables efficient multi-layered (ML) and/or multi-dimensional (MD) virtualization of a wide variety of technologies on a single or multiple (a)synchronized view(s)/scene(s), with the ability to zoom in and out of levels of hierarchy and obtain additional details at each level.

More specifically, embodiments are intended to enable the automation and integration of many functions related to the creation of a device, a transistor, an integrated circuit or a system of devices on a single platform and in an assisted manner, as well as to facilitate its understanding, virtualization, visualization, verification, marketing and the like. These job functions may include, but are not limited to circuit development operations, such as design, review, packaging, manufacturing, test, simulation, failure-analysis, marketing, sales, publishing, etc. This invention details the automated design and development operations, virtualization, visualization, verification and support of a device or an IC as if each one of its building blocks was 3D printed or entirely graphically represented but is not limited exclusively to transistors or Integrated Circuits (ICs) and can be applicable to other entities such as human-beings, animals, cars, machines, satellites, and the like.

A non-limiting embodiment of a method includes creating, receiving and/or interpreting a document that includes user-entries, a text/symbol specification, a device model, and/or a physical layout of a device. The method also includes accessing and/or generating a library associated with the physical device and generating a virtual device based on the full or part of the physical layout and the accessed library. When partly virtualized, for instance similarly to mixed-mode spice simulation, a portion of the device may be virtualized/magnified/highlighted, while other parts of the design may not be displayed or remain represented in device-symbols (transistors, gates and/or the like). Virtualizations of a device are not exclusive to multi-layered and/or multi-dimensional device-visualizations. For instance, to optimize memory usage, a virtual device may be displayed in two-dimensions while allowing back and forth transitions between several design-steps (from process-layers to product's marketing).

The method may generate, virtualize, recreate (through reverse engineering), visualize, and verify functionalities of the target device. For instance, a user may select to create, design an operational amplifier (op-amp) from scratch, architect, layout, productize (package, etc.), test, simulate, qualify, mitigate to certain effects (e.g., radiation effects), publish, document, market and sell it right from within the same platform manually, programmatically and/or autonomously. The latter means that if for instance, the tool does not have all the required information to design the op-amp, it will access resources via the internet, such as but not be limited to generally accessible search engines, online encyclopedias, and the like. The tool may further employ native, and/or remotely available Artificial Intelligence (AI) and Machine Learning (ML) resources, including Deep-Learning (DL) Techniques and the like, to complete its libraries and build the appropriate design.

DETAILED DESCRIPTION

Figure 1:
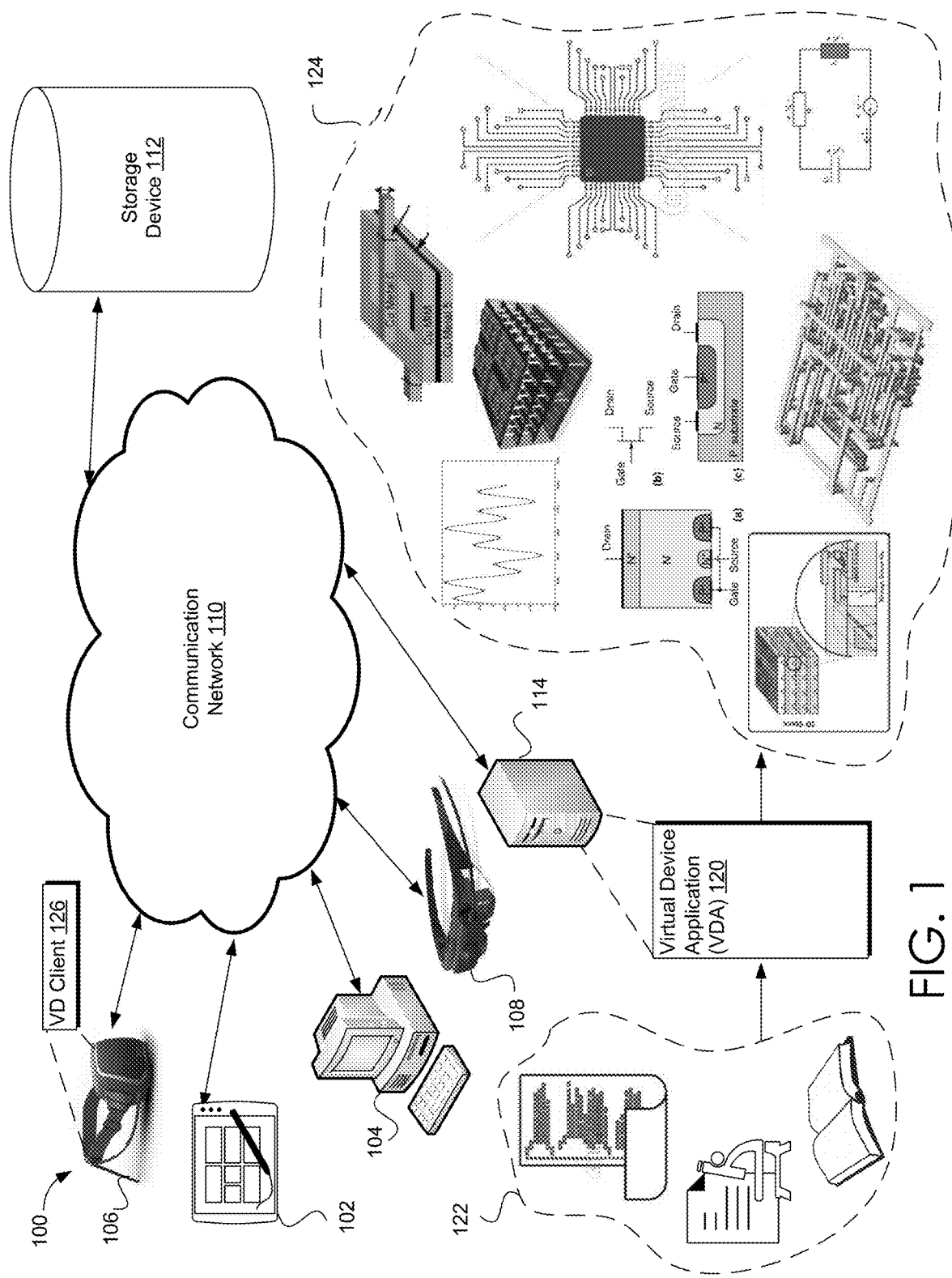
FIG. 1 illustrates an exemplary embodiment of a virtual device generation system that is consistent with the various embodiments presented herein.

Briefly stated, the various embodiments provide an integrated platform, tool, or toolkit, such as but not limited to a Software Development Kit (SDK) and/or a mobile application. These embodiments enable the various steps of development operations from design to sales, the virtualization, the visualization and the interpretation of a device so it may be fully created (designed), viewed, manipulated, packaged, simulated, tested, published and marketed right from within the platform. The resulting virtual device (VD) may be a multi-layered, -dimensional, -angular, -disciplinary, -documentarian, -service, manipulated and used in multiple ways. Such manipulations may include rotations, translations, zooming in and out, of the device and linking to other documents. Manipulations of a VD may include distorting a shape of the device in one or more spatial dimensions. Manipulations may further include folding, bending, and/or twisting of the VD along one or more axes. Manipulations may include stripping off or adding layers to, the multi-layered visualizations. The various result embodiments provide a fully integrated platform for the virtualization, visualization, manipulation and verification of one or more devices within a (non-)immersive environment with or without enhancements for an augmented virtual reality. That is, the provided VDs by the embodiments may include visual representations of the VD via a traditional display device in a non-immersive environment and/or within an immersive environment via new virtual-reality (VR) devices. For instance, a user may create, manipulate, in real-time, layered multi-dimensional views of a VD in a virtual-reality, augmented-reality (AR), augmented virtual-reality (AVR), and/or mixed-reality (MR) environments.

The platform, too, or toolkit may herein referred to a Virtual Device & Circuit (VD&C) tool, or simply the "tool." As discussed throughout, this enhanced tool includes many benefits and advantages over conventional tools. The embodiments of this enhanced tool enable efficient multi-layered (MLy) and multi-dimensional (MDim) virtualization of a wide variety of technologies, with the ability to zoom in and out of levels of hierarchy and obtain additional details at each level.

The VD&C tool may be cloud-based software (SW) desktop/web/mobile application that enables the automated transformation of an entity or device (e.g., transistor or IC) text- or graph-based specifications into an interactive Single Virtual or Augmented Virtual Reality View (AVR), as if the circuit was 3D-printed, while being fully-accessible. Each one of its building blocks (layers and clusters) can show an MLy/MDim AVR view and be augmented with useful information. The embodiments may be MLy/MDim, interactive, animated & scalable with additional cloud-, web- and/or server-based information.

The displayed information in the AVR views may be generated 1) programmatically or autonomously from the tool's already stored contents (native device libraries, databases, and the like) and/or 2) manually from the user's input specifications (user-provided device libraries, databases, drawings, and the like). The embodiments enable the overlayering of various multi-disciplinary circuit architectural blocks and layers (process, device, design, architecture, compiler, etc.), link to documentation and marketing materials (datasheets, application notes, etc.), demonstrate self-testing, circuit-simulation, etc. The displayed content is as repeatable, detailed and elaborate as desired and needed. The tool's overall operations are controlled & supported by a powerful yet intuitive, interactive and engaging Graphic User Interface (GUI) that is ready to interact with the user at every step of the viewing and/or run the AVR view in free-play to broadcast the device contents, similarly to a short documentary movie. It will allow seamless, intuitive, gesture-guided transitions between its under-layers (material compositions for instance) and sub-layers (device symbols, circuit schematics, etc.) in interactive and animated manners. The SW application supporting documentation is invoked autonomously and/or through touch, gestures and can be voice-guided. The embodiments integrate various technologies, such as but not limited to 1) Virtual & Augmented Reality, 2) Computer-Aided Design (CAD) tools, 3) Electrical-Engineering & Semiconductors, and 4) Mobile & Cloud Computing, into a single tool or platform that is well-suited for the betterment of the electronics educational systems, as well as R&D applications.

Applications may extend to various industries, where VD(s) need to be displayed in another reality (physical and/or virtual) along with other virtual and/or real objects, such as in e-commerce where VDs representing furniture may be displayed right at the buyer's home, clothes on a real-human being (not her/his image) to try (the clothes will effectively take the shape of the human-body), cultural events in real or virtual locations where multiple individuals (local, remote and/or virtual may attend), multimedia entertainment (movies with real and/or virtual characters), etc. The virtual objects will leave the smart-device to be part of our reality (home, office, etc.) as virtual objects and interact with our real objects to create an MR view in an MR-environment. They may be multiplied, diversified, augmented, changed, reshaped, readjusted, given voices, and the like. People from all over the world will be able to visit the Mets, the Louvre, the great wall, the pyramids, and other tourist locations, and participate in gaming applications with virtual individuals.

Various physical properties of a virtualized device may be generated and/or simulated, as well as presented to the user within an immersive and/or non-immersive environment. That is, the physics of a device may be viewed and/or simulated to any level of granularity or accuracy desired by the user. For instance, the embodiments may generate visualizations and simulations of the electrical properties of discrete electronic device(s) and electrical circuits, including highly integrated circuits, such as logic devices. A user may provide any physical, chemical, and/or biological model to simulate and test the physical properties of a VD. Likewise, the user may provide any visualization model from which to generate the multi-layered and multi-dimensional visualizations of a VD.

In addition to programmatically/autonomously generating designs, virtualization, visualizations, simulations, test and packaging techniques of a VD or a set of VD(s), the embodiments may provide multimedia contents that document, publish, market and enable selling or distribution of the VD. For example, any information (e.g., multimedia content) regarding the VD may be bundled and/or combined with the visualizations and simulations of the VD, and provided to the user. For instance, any information included in one or more documents regarding the virtualized device may be presented to the user within an immersive environment.

In various embodiments, multimedia content may be generated that includes information about the virtualized device, including visualizations and results of the simulations and the tests of the device. Such multimedia content may include an interactive target document that is generated from one or more static source documents, such as product datasheets, test reports or an improved version of the current design. Multimedia content may be generated and/or updated autonomously via AI/ML techniques. Various embodiments of generating an interactive target document documenting a device are discussed in the '789 application. Thus, the various embodiments herein may incorporate any of the methods or techniques discussed in the '789 application in the generation of documenting content for a VD.

Documenting content of a VD may be provided to a user within a non-immersive environment or within an immersive environment. One difference is that in an immersive environment, such as a VR, AR, or an MR environment, the user may be immersed in the environment. For instance, in an MR environment, the user may walk through the layout; tour the designs as if the circuit layout is an open-space. That is, the user may be immersed within an IC and be provided views that would not be possible otherwise. The scale of the physical features of the IC may be increased beyond the natural scale. For instance, the size of a single transistor may be increased to be comparable to that of an individual. The individual(s) may then change the VD(s), for instance by zooming in/out through hand gestures and/or voice commands. When these actions are detected by the sensors and the cameras that are wirelessly connected (or wired) to the smart device running the VD tool, the latter will broadcast the changed VD views to the visual projectors, providing a major freedom to the user(s) and greater visualization experience with sizeable screens.

VD documenting content may augment the presentation of the visualization and/or simulations of a VD. For instance, while manipulating a VD within a VR environment, the user may simultaneously view a movie or an animation regarding the device. The movie or animation may be generated by the various embodiments discussed in the '789 application. In other embodiments, a movie may be generated from the virtualization scenes.

The various embodiments may automatically (programmatically and/or autonomously) design and/or virtualize a device from local and/or global device libraries, databases, drawings, design files, and the like. A user may provide additional and/or alternative design specification or recommendation(s) for additional and/or alternative devices to generate, simulate, and/or manipulate. Such additions and/or edits to libraries, databases, drawings, and/or design files may be stored for later use or improved incremental design techniques leading to novel designs. The entire process may be incremental and self-taught to design new circuits' functionalities autonomously via AI/ML techniques.

The various embodiments may be employed in educational scenarios. For instance, the various embodiments empower students to design, simulate, manipulate and provide recommendations for new VDs within immersive and/or non-immersive environments. The various embodiments may additionally be employed in industrial, as well as Research and Development (R&D) environments. For instance, scientists and engineers may employ the various embodiments to enable a fully integrated workflow that includes a generator, viewer, recommender and/or self-checker for the design, simulation, and testing phases for any product or prototype of a device.

As used herein, a virtual device may include, but is not otherwise limited to various virtual electronic components. That is, a VD may include a virtualization of discrete electronic devices, such as diodes, transistors, resistors, capacitors, inductors, and the like. Virtualized electronic devices may also include integrated circuits (IC), printed circuit boards, and the like. In the various embodiments, a virtualization of any (IC), such as but not limited to memory/storage devices, processor and/or logic devices, System(s)-on-Chip (SoC) may be generated. However, the embodiments are not limited to the visualizations and simulations of electronic devices. Virtualizations, visualizations, verifications, test and simulations (etc.) of virtually any device, such as but not limited to automotive devices, aerospace devices, medical devices, biological organs and cells, hardware equipment's and the like may be generated by the various embodiments.

Conventional design tools may insure the correct design of an IC but not its virtualization for education and information purposes. For instance, conventional tools may not link all of the IC building layers. In contrast, the embodiments herein may employ architectural blocks to link IC building layers. In addition to the use of new databases & libraries, the VD&C tool may employ and modify existing device & circuit libraries such as Spice models, CAD databases and libraries, and the like. The embodiments may be employed to train new engineers to the widely-used IC Design and Simulation tools right from the tool, and allow engineers to link and correlate their current design and simulation tools with the tool. The embodiments may remain consistent with the current scientific and semiconductor representations.

In contrast to, and to the advantage of, conventional tools, the enhanced embodiments of the VD&C tool include the addition of new libraries & databases (process recipes, chemistry interactions, mathematical calculations, etc.) to complete the full view of the target Transistor or IC. Furthermore, the different compilations & interpretations techniques to standardize the existing Device & Circuit libraries & databases so all contents from every discipline (process to software compiler) enable the automatic display within a single view. The embodiments are flexible so that any user can add markups, make changes to it and own its new modified content. The embodiments include documentation, data-processing and scientific features that accompany its display and information aspects. The embodiments employ machine-learning techniques to learn from previous user-tool interactions, related documentations and views, to continuously keep on improving the tool's contents. The embodiments condense scientific information from various online resources into a single self-sufficient view that is multi-disciplinary and rich in its content. A generated VD, integrated into a single data structure may be animated, interactive and mutable with user interactions as well as with the displayed content. A VD may be integrated and used within the context of mobile devices/applications & web apps to view & share its content anytime & anywhere.

To re-iterate, the embodiments of the tool may display and generate a virtualized version of a device, such as but not limited to a transistor or an IC in a single multidimensional and multilayered view, programmatically and/or autonomously from the tool's native and/or user-provided libraries and databases. The tool may provide views and transitions between views seamlessly and intuitively horizontally between the circuit's building blocks & vertically through its layers (from top (circuit) to bottom (materials) and vice-versa). The tool may link additional information (remote or local) when needed (textbooks, datasheet, marketing and sales information, weblinks, etc.) The tool may display and animate the main interactions between the various building blocks with supporting scientific explanations (mathematical, chemical, etc.). The tool may enable the user to provide inputs, selections, and the like via with the user to gather his/her inputs and selection touch-based commands, physical gesture-based commands, voice-based commands, or the like Virtualizing a device (i.e., generating a VD) may include bringing to life the entire process of building the device from initial concept to sales and support. It should be noted that visualizations of the VD may include views of the device from every angle, layer, and the like, as well as views of the augmenting information or documentations, such as a target document. The virtualization may be in real time.

As noted throughout, each stage of the virtualization may be partially or fully automated. More specifically, the generation of a design may be automated, as well as the handling of the design, e.g., the simulation, test, verification, and support of the design. Such automation of the virtualization of devices may employ artificial intelligence (AI) and/or machine learning (ML) technologies. Such AI/ML-enabled embodiments are differentiated from conventional programmatic design/generation that employ CAD tools. For instance, the tool may employ ML techniques that enable the generation of designs from fewer specifications; that is the learned experiences the tool accumulates is employed to design devices, rather than user-explicitly provided specifications. Initial versions of the tool may rely heavily on the programmed code and the stored libraries/databases. As the user continues using the tool, the tool accumulates inferred knowledge, via ML, and enables the automatic generation of additional designs. In various embodiments, the re-coding of some of the tool packages adapt themselves to additional designs.

One non-limiting example of such AI/ML-enabled embodiments includes the at least partially automated design of a reconfigurable field programmable gate array (FPGA). Portions of the FPGA bitstream may be varied along with the tool's learning process and progress throughout time. The tool's learning process may mimic the evolving understanding of design rules, heuristics, and techniques, to that of a student or engineer. For instance, the non-volatile portion of the FPGA (memory or ASIC) may store the coding of the ML algorithms while a volatile memory-portion (FPGA core and SRAM blocks) can store the dynamic info (designs (bitstream), code and data). The ML techniques can be reprogrammed as well by the tool itself if it has learnt that it has to do so.

The various embodiments may provide a translator that translates and compiles a user's natural language statements into programmatic languages and/or executables, such as Verilog, VHDL, GDS, or other semiconductor languages. A VD compiler component, such as but not limited to VD compiler component 248 of FIG. 2, may be enabled to interpret common words such as op-amp, switcher, FPGA, and the like and generate the generic version for them. More specifications will mean more design/test/etc. details. The tool is enabled to programmatically and/or autonomously design devices based on marketing specifications. The tool is further enabled to automate the optimization, testing, simulations and most development operations that are related to the product-devices. Various embodiments are implemented on an FPGA/SoC/ASIC circuit with dedicated-IPs such as MI/DSP IPs and/or Test/FTT IPs that allow the Built-In-self-Test (BIST) or Built-In-Self-Repair (BISR) of the actual VD and/or of other VDs. The tester design may be accessed via a set of APIs.

Whether in an immersive or non-immersive environment, virtualization and augmented reality are both possible. The difference is that, but not limiting, in an immersive environment, the user can walk through the layout, tour the design as if the circuit layout is an open-space but the virtual views are practically the same. The added thing in this case is the magnification of these views beyond our scale (human body), so that the user can be part of the view. The visualization may be then different, as it has to account for our human body footprint.

Embodiments include various security features. For instance, for security or confidentiality concerns, a user may choose to make certain proprietary contents (APIs/libraries/databases/documentation) accessible only to a private user-group that has extra security credentials and protections. In various embodiments, such information may be encrypted and stored on secure servers and/or data-centers. Only users with privileged security credentials and cryptographic keys are provided with access to the secured information. The originator of that information will own these contents. Additionally, information may be stored encrypted (or not encrypted) on various vendor or customer servers or clouds. The users that are allowed to view the vendor-contents are selected by the vendor and will have privileged rights similarly to the VPN access that is provided to company employees, except that not all employees will have the same rights to view similar contents. Many users can collaborate on the same VD through the cloud. The result may be private to the group, published to an extended group or to the public.

Virtually any function related to creating a semiconductor can be virtualized and automated. Such automation may not necessarily be programmed automation, but instead may be inferred via artificial-intelligence and machine learning. The tool may autonomously design an IC for instance, based on a few specifications from the user. The more detailed and specific these guidelines, the more particular is the result IC design. An embodiment of the VD tool may include an SDK that allows new designs to be built manually by the user, programmatically by the tool's designer and/or autonomously by the tool itself. The tool may be equipped with AI/ML for automated design, whether a tester, a simulator or other that allows the design of new IC, such as new op-amps, processors, DSPs, etc., without explicitly having been programmed in the initial design. An embodiment of this invention includes the tool's automated self-upgrade to perform most of the requested functions. For instance if a new DSP function is required for a new IC design but is not existent in the original tool database of APIs, the tool will automatically search for it (for instance on the web) and upgrade its algorithms to accommodate the new design technique. As a result, rather than dedicating an FPGA to a given DSP function, the tool implements the appropriate DSP function from the cloud, reconfigure and reprogram itself, or design the appropriate DSP function, adjusts its own parameters and reprogram/reconfigure itself. With this added code-adaptability, hardware utilization may thus be significantly reduced, as less hardware along with less coding can accommodate more functionality that is continuously incremental, enhanced and autonomously improved.

Furthermore, the virtualization and visualization of a device may be created manually, programmatically, and/or autonomously, as well as be supported and augmented with additional information. This result virtual device (VD) shape, geometries and/or content may be updated through additional databases, libraries, web-information, user-tool interactions and/or AI/ML techniques. While being self-contained in a single platform, the result VD may be and is not limited to an automated and self-taught Device and/or IC builder, designer, simulator, tester, marketer, and/or instructor, and may be applicable to each being, bacteria, and/or object in our reality.

The visualizations of a virtual device may be provided to the user within a non-immersive using a traditional device (laptop, smart-tablet, etc.) and/or an immersive environment, such as a virtual-reality (VR), an augmented-reality (AR) and/or an augmented virtual-reality (AVR) environment. A non-limiting embodiment of a method includes partially or fully displaying a single or multiple VD(s) in a mixed-reality (MR) environment. The latter mixes a single or multiple environments, be it a real-environment (a physical room), a non-immersive one or a virtual one (VR, AR, AVR). In an MR-environment, the viewer(s) can take part in the newly-created environment, with real footprint(s) possibly impacting their surroundings. An MR environment may be visualized in a single or multiple (a)synchronized view(s), centered around a single or multiple focal points where their coordinates, the shapes, and the dimensions of these views are selected autonomously by the main environment-controller (smart-device) and/or through body movements, gestures, voice commands and the like. In an MR endless environment, but not limiting, the AVR view may be displayed in an alternative reality anywhere within an existing reality (even when there are no physical boundaries) or vice-versa, as if new door(s) and/or window(s) have opened in the current real-environment to display other virtual spaces or the virtual objects take place in our environment.

The VD(s) and the user(s) themselves may be immersed individually or collectively into this new AVR environment by simple gestures, voice commands and/or the like, stay within the current mixed-reality environment to view all displayed realities, switch back and forth between the different realities, and/or open or close other outlets to display other AVR views within the current existing reality. Unless equipped with sensors, audio-speakers, ultrasound devices, optical/visuals projectors, cameras, LIDARs/RADARs, light-stopper, sound-stoppers, RF blockers, and/or transmitters/receivers, and the like, traditional devices, such as desktops, laptops, current mobile devices, touch-screen TVs and the like may not accommodate for an immersive mixed-reality.

A non-limiting embodiment of a method includes visualizing the result VDs in viewing locations (meeting-room(s), theater(s), museum(s), stadium(s), and the like) that may be equipped with audio-speakers, visual projectors, cameras, sensors, stoppers, blockers, transmitters, receivers and other equipment's that can be controlled programmatically and/or autonomously, to create a mixed-AVR environment and allow individual(s) to interact, place the VD anywhere in their physical environmental space, move freely and walk through the VD. The main communication-controller (smart-device and/or the like) of the MR environment will use the captured images from the camera(s), the detected signals from the sensor(s) to detect the users' coordinates and/or proximity relatively to the VD, shapes, movements, voices and gestures and will adjust the projectors accordingly to display the affected views, as if the users are truly affecting and reshaping that environment in the same manners that they do when they touch, enter or exit a real-environment. The main controller (a smart-device) will capture continuously camera images (similar to a video), sensors' signals and all the devices digital signals to interpret the user's movements, gestures, and signals. The comparison between two successive pictures may indicate a movement, a gesture and/or if combined with voice commands may indicate a gesture to point to the VD area to be updated/zoomed-in. For instance, pointing to a transistor and saying "Open" will transition to the process-layer of the device. The word "open" may be replaced with a zoom gesture (two fingers opening-in). Furthermore, the user may point to an area outside of the VD in their living-room and the surroundings peripherals (cameras/projectors/etc.) will move towards that area to place the VD object, exactly as the user would view it in real-life with the furniture even when that space has no physical boundaries. The pointed location will be the center of the selected VD; the user may also allocate an area of where to position the VD and limit the dimensions of its shape with two hands. The LIDARs/RADARs/optical-blockers/ultrasound blockers will create those boundaries for the projectors, through sound/optical/electro-magnetic waveforms, so the image will be stopped where it should be. The user may display as many VDs as they need to, extract VDs from real-environments to project to other environments. So an object and/or a human being can be extracted from any image and be projected in any reality. Its projection can be electro-magnetic, ultrasonic to create a sense of existence (touch, smell, taste). The tool may reproduce and/or mimic visual, vocal, touch, smell, taste and the like effects and retransmit/receive them through any type of wireless and/or wired transmission.

The surrounding HW peripherals cameras/sensors/LIDARs/RADARs/etc. will aim to recreate the 360 degrees view of the virtual scene in the viewing room (meeting-room, living-room, etc.). The sensors may not be used but they can help to detect quickly short and small movements, if that is an area that is obscure to or hidden from the camera(s), for instance hand gestures may be detected better when the user is wearing gloves that are equipped with sensors. It is a trade-off between how quickly can the sensors' signals be transmitted/received from wearable devices to/from main-controller and the digitalization/interpretation of the camera images in real-time and at high-speed faster than the human body movements, and at very-high-speed faster than the VDs changes at machine speeds. Cameras may be more useful to detect movement and proximities to other objects, so real humans won't bump into virtual objects. VDs may also be superposed, such as when trying a dress or a suit.

Surrounding peripheral hardware, such as cameras, sensors, speakers, projectors, LIDARs/Radars and/or the like, may also be integrated in a single tracking/projecting/analyzer device and/or within a traditional device(s) (such as but not limited to a TV, a smart tablet, and the like) to project similar environment filling all or part of our current environment. An integrated single chip solution may optimize timing. They can work autonomously and be synchronized to track all of our movements to virtualize us anywhere and everywhere. To limit power dissipation, the main application-controller remain in standby, sleep mode and/or charging mode. The integrated single solution device goes to charging mode when not used; it docks itself for charging. It transitions to operational mode only when movement is detected and/or ordered to wake-up. Cameras recaptures our image and the main controller's application re-draws us and send the appropriate actions to its peripherals (internal and/or external). They are equipped with motion-sensors and the entire system may operate autonomously. These devices can fly, walk, climb, slide, roll, tilt, take actions, follow-us wherever we go to create an MR environment, etc. and we call them tinker-bells; they are as small, light and autonomous. They can take many shapes, any color, sing, speak, act, report, watch, take actions, protect, defend, ally/synchronize to lift objects/human-beings, travel, transmit/receive signals, etc. They can plan, act, regroup, reorganize, design, update, modify, and or augment our (mixed-) reality. They are autonomous self-driving smart-devices but with thoughts, super-power of processing/analytics, actions, hands, legs, wings, and/or the like. They can draw our MR environment, by setting light stoppers/blockers as needed. Not all tinker bells are deployed for every application; some remain docked if needed; they will assemble, regroup as needed, dock in a given order (in line for instance), on the walls, the floors and/or the ceilings for charging and/or on an object (steady or moving target (our shoulders for instance)), to rest and save power and to take position to deploy when needed. For instance, to redraw a VD that is a 2D screen, a few (one to two) tinker bells are needed to limit the screen space, while when the VD is MDim and/or MLy, more than a single tinker bell may be deployed. They can replace all of our electronics to create our MR environment (phones, desktops, etc.). The more integrated is the tinker bell solution, the less tinkers we will need for our MR environment.

Users can select what objects to project, what to select for broadcast, the main moving target, what can be re-shaped and what should be kept at real-dimensions (coach, table, etc.), etc. In operational mode (not standby nor sleep modes), the MR-device is automated for continuous acquisition, projection, re-projection, etc. MR-devices are portable, mountable, removable, etc. They can integrate and be configured for as many functions as needed/requested. It is an MR, autonomous, portable, smart-device for an MR portable-smarter space. Nothing is fixed, all reconfigurable, adjustable, mountable, recyclable, programmable and/or animatable with as many colors/shapes as requested by the user or as the tinker bell feels like it. There is no final design, the user can instantly update their home and space as desired.

A living-room and/or any other physical space can combine many realities (virtual, real and/or MR). Also, a limited MR-experience may be created by projecting the AR views that can be acquired by a smart-tablet integrated camera. If the tablet is wirelessly connected to a projector, it can broadcast the view within our living room or anywhere, even when that space has no physical boundaries. Others in the same room and/or from elsewhere may join, if using the same smart-device (SD) application. The SD may be a (smart-)TV set connected to an Apple-TV for instance. The effect may be recursive and operational in real-time, as the tablet-projector/camera/sensor/LIDAR/RADAR set that created the projected VD view in the room and/or elsewhere may also integrate other objects and/or human(s) walking for instance through the VD view and add them to the view to be in its turn projected. In its most simplistic form and using existing SDs, an SD can project an MR view, that mixes humans with other virtual objects in real-time in an AR fashion. In general, two or more wirelessly and/or wired synchronized SDs (master and slave) may suffice (180 degrees each) in most cases, to capture the back and front motions of the added objects. The master SD will assemble both views and (re-)transmit them to the projector for mixed-reality virtual-display. The projector(s) along with other required peripherals (LIDARs/RADARs/antennas/RF transmitters and/or receivers/etc.) may also be integrated in future smart-devices to create a single-product solution. That way both SDs may detect the moving objects, integrate them in the VDs and broadcast synchronously. The app related to the tablet will detect the virtual objects (VDs) and the moving-target(s) at that instance and re-adjusts the view accordingly. The projector(s) broadcast range, VD shapes and/or dimensions are controlled by the SD. The projector(s) should be able to create a virtual broadcast that provide the 3D reality-effect. The cameras may be aided by wearable devices that are equipped with motion-sensors for instance.

Another non-limiting embodiment includes using mixed-reality devices, such as progressive MR-glasses, a wearable device (hat, helmet and/or gloves for instance) equipped with sensors/cameras/projectors/etc., a combination of multiple MR-devices and/or the like that can mix various realities and that are equipped with similar peripheral devices (cameras/sensors/etc.) to detect users' movements. Visual and/or sound-projectors, antennas, etc. may be needed in the case of a wearable device that do not use a screening device (such as smart-glasses, tablets, TV set, etc.). If equipped with audio/visual/optical/RF antennas/projectors/blockers/stoppers that include, but not limited to, optical/sound RF devices, LIDAR/RADAR technologies, the communication controller may adjust the broadcast ranges and/or VD shapes. The communication controller, projector(s), speaker(s) and/or the like, may be remote and/or be integrated in the wearable device.

When equipped with these MR devices (wearable's, tinker-bells, a combination of both and/or the like), users can navigate autonomously through the VD view anywhere and anytime without the need to be in an MR viewing-room by simply making certain body gestures (such as sign-language) and/or sending voice commands and/or the like. The MR devices will take camera snapshots, detect the movements and retransmit the new MR environment at the appropriate coordinates. MR devices may also be synchronized with touch-screens to allow the viewing/sharing/logging/storing/projection of the displayed information individually or collectively. As an example, but not limiting, an MR-TV may project, autonomously and/or when guided by the user(s), a single or multiple VD views. MR devices may also enhance the viewing experience in an MR viewing local which sensors, speakers, projectors and communications-controller communicate directly with the MR devices. Tinker bells will adjust automatically to the space, climb/go through walls, fly to/from locations, and place themselves in the most suited positions to project an MR environment, help/guide/support/deploy/etc. as needed. Tinker bells are reprogrammable, reconfigurable manually and/or automatically (programmatically and/or autonomously). They can be our phone, our tablet, computer, transportation means if they ally, our airplane, our self-storage tool, our shopping cart, our communication tool with the rest of the world, and most importantly our companion/helper/guide/imaginary-friend/ etc. The sizes of the various integrated realities may be adjusted by the users' gestures (zoom-in, zoom-out and the like), voice commands and/or the like. By similar commands, VR/AVR/MR environment can be added, removed, adjusted, changed, be affected/impacted (being immersive and/or non-immersive), augmented by the users on the fly and in real-time. As an example, VD views may be screened on a TV (3D, 2D) or projected in our living room to take part of our setting. Application may be used in furniture trials before finalizing a shopping transaction. Other AR solutions allow trying clothes, furniture on a smart-device while assembling it with a picture of your living room while MR-devices will allow the user(s) to try that furniture in their actual room, be projected in a certain location, and/or on real-people. This may be quite helpful when building new constructions to perfectly see the new bathroom, living-room, house, and the like before building takes effect, yourself wearing new clothes, makeup, etc., to save money and time. The final platform may allow trials of many architectural designs, clothes, furniture and/or any other entity that we would like to interact with and if approved, we can order the items from the same platform. Such invention may result in huge timesaving and design-optimizations. Rooms in your house may become fitting rooms in shopping centers. With MR deployed tinker bells or other MR-devices, MR smart locations may instantly adopt to MR environments, be equipped with electro-magnetic fields to create various ranges and levels of real physical-pressures that can shape around humans or any shapes of that matter. MR-Theaters may be filled with Virtual Objects along with real human-beings. In an MR-environment, all objects may also be virtual. In other words, museums, theaters, and the like may be virtual and artistically created to accommodate to a finite or infinite number of audience. It may be scalable, adjustable, moldable, changeable, etc. Attendees may be real, virtually created from a real device (as demonstrated above) and/or artificially and graphically invented.

Users may be players, actresses/actors, dancers and/or take other roles in a projected reality that is entirely or partially immersive, and/or mixing various realities. With connected MR-TVs (smart-TVs) and/or wearable devices, an individual may interact with a group of people and/or automated VD views (in the shape of human beings, robots, etc.) to participate in a game, a movie, and/or the like, right form their living rooms while moving freely and/or wearing an MR-device, offering VR/AVR nowadays environment an unmatched freedom of movement. MR-TVs (connected or not) may offer total freedom from wearable devices, complete autonomy to a single or multiple user(s), that may interact on a single and/or various synchronized VD views.

Such invention may find great applications in smart MR-offices, -labs, -rooms, -homes, -museums, -theaters, -cities and/or the like to enable MR-meetings, -games, -movies, -tours, etc. User(s) will be stepping in/out of our reality, coming out/in of our connected MR-TV, -smartphone, -smart-table, -smart-(progressive-)glasses and/or the like for a work-meeting and/or the like. We can be virtually projected anywhere and everywhere with our current, virtual or mixed reality in another virtual or mixed reality environment. User(s) of the smart MR-connection from all continents and their created fictional VD views may establish certain communication/interaction rules, while making a movie, a game, a documentary and/or the like. Each user may dictate boundary limits for others, limit the range of their interactions, set the rules of a game (volley-ball, hand-ball, marathon, etc.), set the movie scenes for actors, and the like of user-to-user interactions. Actresses/actors may have their scripts shown in AR next to their virtualized selves. Recordings/replays of their interactions may be stored/logged/edited, etc. User(s) may be projected to meet in VR/AR/MR environments (a meeting-room for instance) around VD view(s) that may also be projected in the same VR/AR/MR environments, interact, exchange ideas, make modifications to the VD, log and save their updated VD view(s). Touch wearable-devices (gloves, suits, and the like) may provide the users with the sense of touch/smell and the like.

Such invention may remove all existing physical boundaries between human-beings wherever they are in this universe. Projection of a magnetic field that can shape a human-being and have a haptic force or interaction to provide an interaction with another being or user. Tinker bells may help channel that EM energy between two remote users that are both equipped with MR devices. This is how we can be in many places at once, have guests from all over the world if we want to, that can tour our smart homes anywhere and anytime, rent virtual and real spaces virtually anywhere and anytime in the world (workspace for conferences, work-meetings, party-space (wedding, party, etc.), tourist attractions locations for cultural events) for meeting and being with others. Crime scenes may be recorded and may be prevented in real-time as MR-devices will be able to detect abnormalities, such as boundary crossing, illegal weapon-use, loud voices, alert the authorities, etc. It may be privacy invasion but it is one of the ways towards security, transparent communications and provide better human-to-human interactions, hence a more civilized world. Data may be saved only if suspicious to optimize big-data applications and optimize data-storage and reaction times, data-throughput and bandwidths. Sensors will record initial location and detect afterwards all changing movements from an individual or a group of people and project surroundings again in real-time, so the naked eye would not detect the delay between the object movement, its detection by the sensors, the projector (audio, visual, optical, ultrasound, and/or RF) reactions to it and the transmission of these reactions to the connected users. The group of users may choose the objects that may be displayed/added/removed, the selection between master/superposed/connected locations, how and when they share space in a timely manner. Smart locations may also be equipped with other tools other than audio/visual projectors to take certain actions when needed to make certain changes to the environment, a danger is detected and/or the like.

As an example, criminals may be disabled autonomously if a danger is detected. Finally, we can automate the police and the military forces. We can have an endless army with virtual soldiers that can apply pressures on their opponents to eliminate them when endangering others. The VDs will help channel and focus the EM energies on the main targets. By providing coordinates to the EM emitters, VDs may appear like Ninjas or ghosts to play a game, participate in a meeting, be and participate in any type of gathering.

Another embodiment will include ARing a user and projecting his reality with MLy/MDim visualization, where others can join on the fly. It will mean virtualizing that reality, with real characters. Tinker bells can be controlled by the SD (rotation motors etc,) to follow our hand gestures. Camera will take hundreds of consecutive pictures to detect our movements, such as video, etc. EM or minor electric shocks waves may be generated to fix boundaries with objects (to be able to sit around a table). The app will see the user pulling a chair, will move the virtual chair or fill it with a real chair, real table setting (part of it to not cover the main table for others to sit around).

TV may be projected with our portable and/or wearable device (helmets, etc.), sizeable and controlled projector. TV can be watched in bed at every angle, position, etc. Users may wear a shielding material for safety reasons.

Laptops/desktops may become a helmet, a smart-device (tablet for instance) that controls a projector, and a projected keyboard, projected screen, and/or projected mouse. Their range may be controlled for, re-sizing, positioning, privacy, ergonomic or physical areas limitations, etc. For privacy reasons, the user may use glasses (MR glasses for instance) to broadcast the content. In this case, the keyboard and the mouse are virtual; the screen is displayed in the glasses; while the SD (mac-mini for instance) is used as the processing unit. The main advantages are in the major reduction of HW equipment's and the real mobility. Screens (VDs) may be adjusted to any size. The limitations of the projector range is in the cluster of photons that are blocked by the VDs, in the tinker bells mapped area, etc. We can control locations of items with hand gestures or voice commands, for instance, order a virtual keyboard to be placed in front of us, a virtual mouse next to it. We may say "keyboard"/ "mouse" and point to the location to where it should be placed and it be there.

Some embodiments may employ the testing and remote methods and systems discussed in U.S. Non-Provisional patent application Ser. No. 15/459,983, filed on Mar. 15, 2017, entitled REMOTE SENSING AND PROBING OF HIGH-SPEED ELECTRONIC DEVICES, the entirety of the contents herein incorporated.

Exemplary Virtual Device Generation System

FIG. 1 illustrates an exemplary embodiment of a virtual device (VD) generation system 100 that is consistent with the various embodiments presented herein. System 100 includes one or more computing devices, such as user-computing devices 102-108 server-computing device 114. User-computing devices may include, but are not limited to mobile phone, mobile tablet 102, desktop 104, virtual-reality (VR) headset 106, augmented-reality (AR) eyeglasses 108, mixed-reality (MR) progressive eye-glasses/screens, audio-speakers, ultrasonic/visual-projectors, cameras, sensors, antennas, LIDARs, RADARs, optical blockers and other wearable devices, such as helmets, gloves, etc. System 100 may also include storage device 112. Other embodiments may include more or less user- and/or server-computing devices, as well as storage devices. Various embodiments of computing devices are discussed in conjunction with at least FIG. 6.

A general or specific communication network, such as but not limited to communication network 110, may communicatively couple any computing device and/or storage device included in system 100. Communication network 110 may be any communication network, including virtually any wired and/or wireless communication technologies, wired and/or wireless communication protocols, and the like. Communication network 110 may be virtually any communication network that communicatively couples a plurality of computing devices and storage devices, such as storage device 112, in such a way as to enable the computing devices to exchange information via communication network 110.

Storage device 112 may include volatile and non-volatile storage of digital data. Storage device 112 may include non-transitory storage media. Communication network 110 may communicatively couple storage device 112 to any of user-computing devices 102-108 and/or any of server-computing devices 114. In some embodiments, storage device 112 may be a storage device distributed over multiple physical storage devices. Thus, storage device 112 may be a virtualized storage device. For instance, one or more "cloud storage" services and/or service providers may provide, implement, and/or enable storage device 112. Such cloud services may be provided by a third party.

Storage device 112 may store any information and/or data discussed herein, including data that encodes a VD generated via system 110. For instance, storage device 112 may store a VD data structure, such as but not limited to VD data structure 300 of FIG. 3. Any computing device, such as but not limited to server-computing device 114 may write a VD data structure to storage device 112. Likewise, any computing device, such as but not limited to user-computing devices 102-108 may access a VD data structure stored on storage device 112.

Any computing device of system 100 may host a VD application (VDA) 120. For instance, FIG. 1 shows server-computing device 114 hosting VDA 120. Various embodiments of a VDA are discussed in conjunction with FIG. 2. However, briefly here, VDA 120 may enable and/or provide a user one or more embodiments of a Virtual Device & Circuit (VD&C) tool, as discussed herein. VDA 120 may take various input information 122 to generate a VD. Various aspects of a VD generated by VDA 120, such as a multi-layered and multi-dimensional views of a device, simulation results, and associated information is schematically represented by VDA output 124. VDA input 122 may include design files, research information, data sheets, device specification, design and/or simulation libraries, and/or databases, documents, e-books, multimedia content, or any information about a device to be designed, virtualized. VDA input 122 may include one or more source documents, such as but not limited to source document 122 of FIG. 1 of the '789 application. VDA output 124 may include one or more target documents, such as but not limited to any of the target documents discussed on the '789 application. In various embodiments, a server-client architecture may be employed. In such embodiments, VDA 120 may be a VD server. A user-computing device may host a VD client that corresponds to the VD server. As shown in FIG. 1, VR headset 106 is hosting VD client 126.

Exemplary Virtual Device Application

Figure 2:
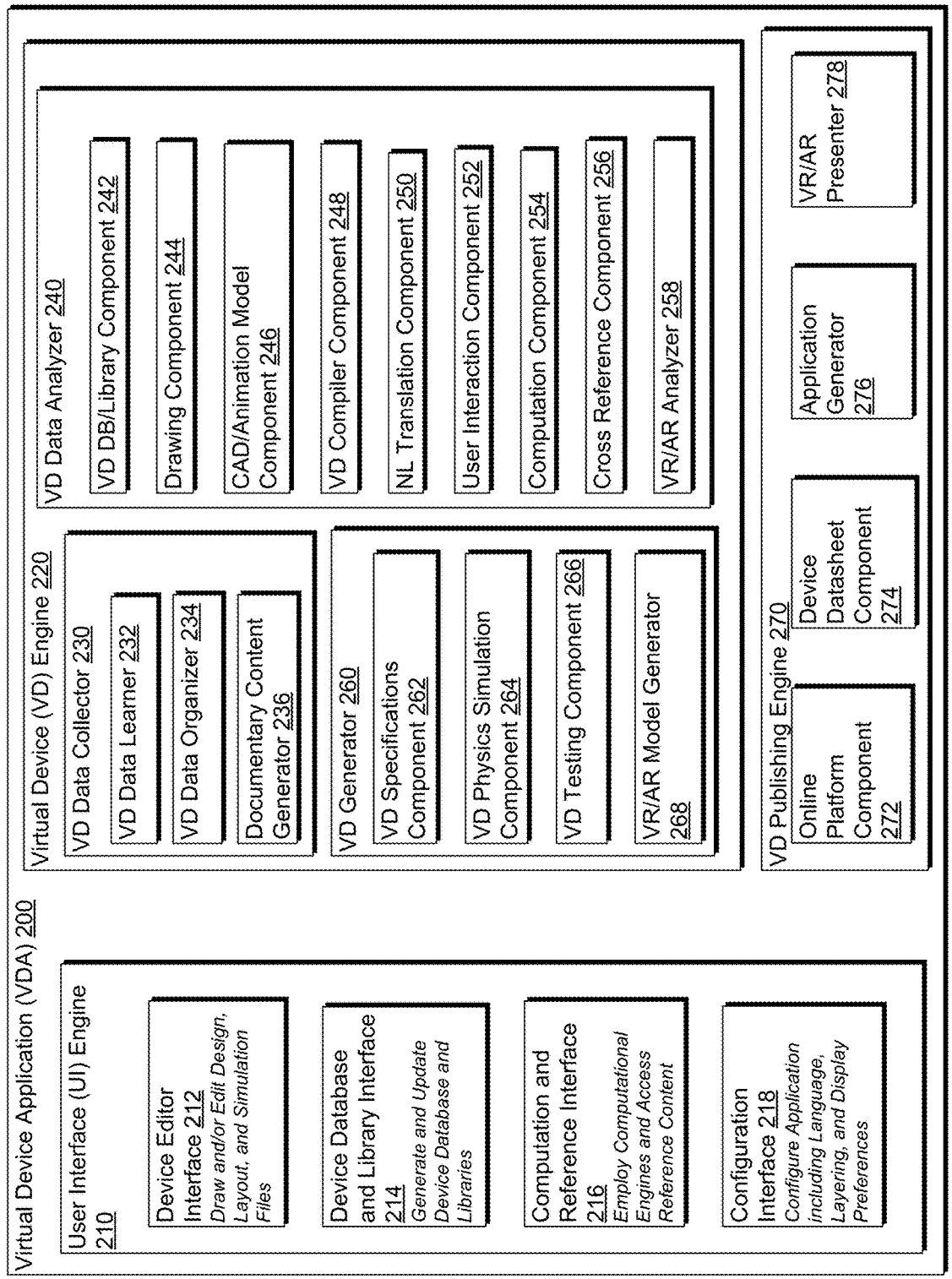
FIG. 2 illustrates an exemplary, but non-limiting, embodiment of a virtual device application that is consistent with the various embodiments presented herein.

FIG. 2 illustrates an exemplary, but non-limiting, embodiment of a virtual device application (VDA) 200 that is consistent with the various embodiments presented herein. VDA 120 of FIG. 1 and VDA 200 may include similar features and functionalities. VDA 120 may enable and/or provide a user one or more embodiments of a Virtual Device & Circuit (VD&C) tool, as discussed herein. More specifically, VDA 200 may automatically generate a VD based on one or more inputs, such as but not limited to VDA inputs 122 of FIG. 1. Various virtualizations, visualizations, simulations, autonomous development operations, and VD documenting content, such as any of VDA 124 of FIG. 1, may be outputted and/or provided to a user of VDA 200.

Building blocks of a visualization may be displayed in a (non-)immersive environment. For instance, the user can zoom in on visualizations of virtualized power electronic circuitries. The amount of information (text and/or graphic) displayed in the (non-)immersive environment may be customized by the user. The user may transition between different views. Virtualizations and visualizations may be generated from portioned virtualization/visualization models so that transitions between various views appear natural and seamless. A user may select one or more areas of a VD to display. A user may dynamically and seamlessly transition to other views of the device.

Any view of a VD may be augmented with information or data regarding the VD. That is, any visualization of a VD may be augmented with VD documenting content, recommendations, self-test, self-verification and self-corrections as well as technology and design comparisons correlated with resulting design performances for instance to improve design and/or to highlight product advantages. The augmenting content or information may be called from a target document regarding the VD, generated via the various embodiments of the '789 application. Such augmenting information or data may include but is not otherwise limited to advertising, marketing, and/or sales information, such as a datasheet.

In one non-limiting embodiment, a virtualization of integrated circuit (IC) is generated. The user is provided transitions between visualizations of the IC's under-layers (material compositions for instance) and visualizations of the IC's sub-layers (device symbols, circuit schematics, etc.). VD documenting information may be accessed via user selections, gestures, and/or voice-guided commands. In another embodiment, VDA 200 may receive, as input a text-based or symbol specification for a given transistor. VDA 200 may generate an interactive, animated, multi-dimensional, multi-layered virtual view of the transistor, as if the circuit was 3D-printed or simply realistically reproduced, with infinite access to every part of its building blocks. The virtualized transistor may be displayed in an immersive environment or on a traditional display device. Such visualizations may be automatically converted and/or embedded within a movie or animation via the methods discussed in the '789 application.

Some embodiments generate a VD by an automatic conversion of text-based and/or a graphic-based device specification. For instance, VDA 200 may receive datasheet for an electronic device, as input, and generate a virtualization of the electronic device based on the received datasheet. When providing the VD to a user, various embodiments may overlay multiple views and/or documents onto visualization of the VD. Various embodiments may generate a final view of the VD. The final view may be automatically sequenced based on one or more views and/or device specifications or datasheets. Embodiments of VDA 200 may generate a target document documenting aspects of the VD, via embodiments discussed in conjunction with the '789 application. Input for VDA 200 may include text, graph, figures, symbols, and the like that include information or description about the device to be virtualized. For instance, the selection of the expression "switch regulator" in the SDK without additional specifications will automatically display the generic virtual version of a DC/DC power switcher. However, the addition of and/or request for specific libraries, databases, and other specifications may create a different version of the VD. The result VD is the interpretation of the combination of, but not limited to, the user(s) specifications, the collected or self-generated libraries, databases and the AI/ML levels of understanding of the SDK tool.

Figure 3:
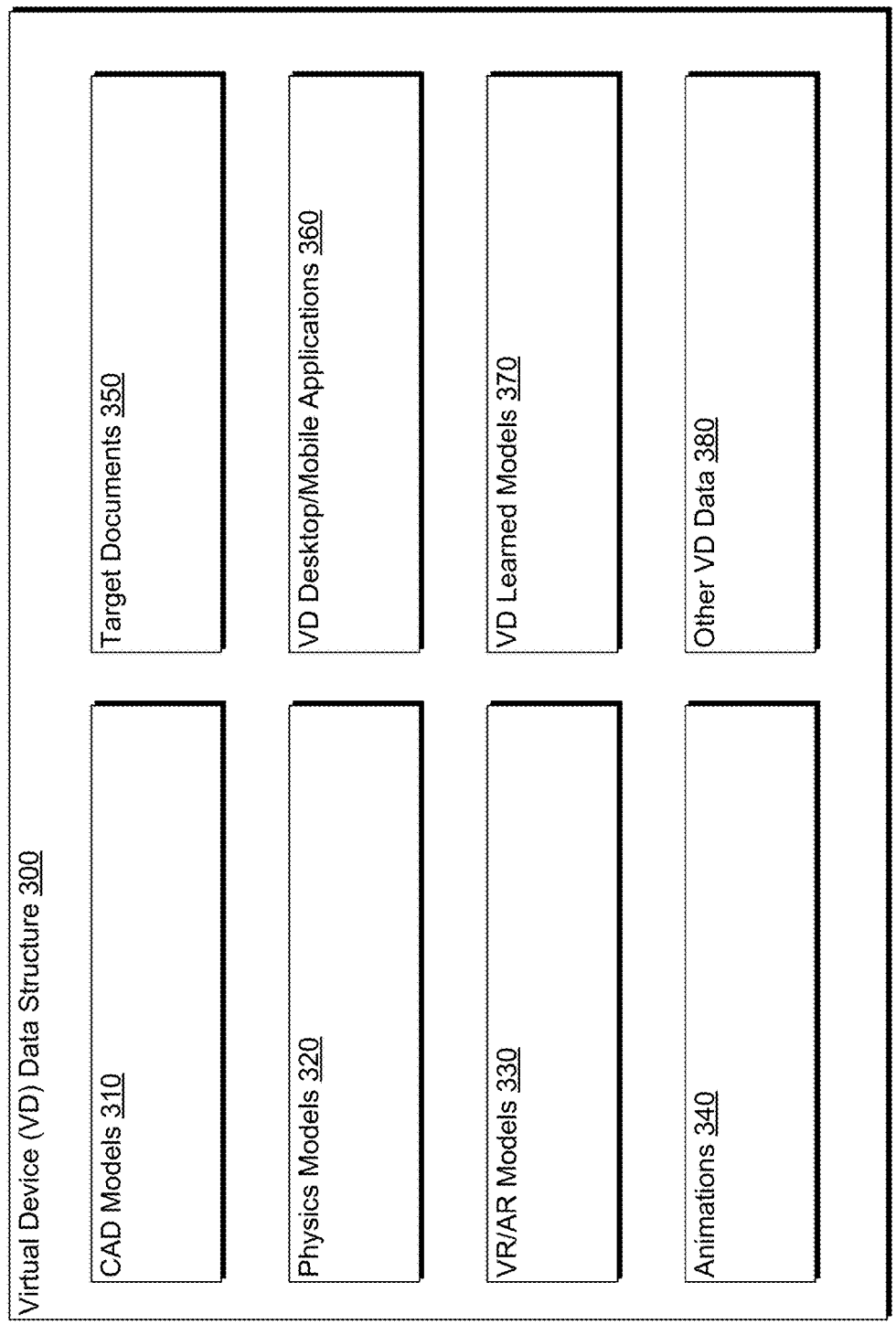
FIG. 3 illustrates an exemplary, but non-limiting, embodiment of a virtual device data structure that is consistent with the various embodiments presented herein.

A VD may be encoded in a data structure, such as but not limited to VD data structure 300 of FIG. 3. A target document, such as the target documents discussed in the '789 application may be generated based on a VD. A VD data structure may serve as a source document for a documentary generation application (DGA). For instance, a VD data structure may provide the input to DGA 120 of FIG. 1 of the '789 application. A mobile or a desktop application may be automatically generated based on the VD and/or VD data structure. Such applications may be distributed via an online platform, such as but not limited to an online application store.

A VD may be interactive, animated, multi-layered, and multi-disciplinary, etc. In one embodiment, virtualization and visualizations of a 3D printed IC are provided. VDA 200 provides seamless, intuitive, gesture (or voice)-guided transitions between the ICs under-layers (material compositions for instance) and the IC's sub-layers (device symbols, circuit schematics, etc.), in interactive and animated manners. The visualization may include over-layering of various multi-disciplinary circuit architectural blocks and layers (process, device, design, architecture, compiler, etc.), link to documentation and marketing materials (datasheets, application notes, etc.), demonstrate current, improved and other design techniques, self-testing, circuit-simulation, reliability Failure-In-Time (FIT) rate calculations, product-qualification, product-marketing and sales, as well as the use of fault-tolerance techniques, and the like. All the VD views can be manually, and/or automatically (programmatically and/or autonomously) generated based on the SDK A/ML capabilities.

In addition to educational applications, the various embodiments automate many engineering, research, and development tasks via an integrated workflow enabled by VDA 200. For instance, VDA integrates the entire workflow of (automated-)design, -simulation, and -testing of semiconductor devices, such as but not limited to transistors, diodes, and logic devices. VDA 200 provides information about such a device to the user. The information may be packaged as interactive content, as described in the '789 application.

The various embodiments include VD libraries. For instance, the embodiments may include pre-built libraries and/or pre-loaded for complementary metal-oxide semiconductor (CMOS) device, silicon-oxide-nitride-oxide-silicon (SONOS) devices, Bipolar CMOS (BiCMOS) transistors, field effect transistors (FET), and the like. Such libraries may include basic architectural blocks for devices, such as but not limited to operational amplifiers (Op-amps), flip-flop circuits, latches, static random access memories (SRAM), electrically erasable programmable read only memory (EEPROM) cells, arithmetic logic units (ALUs), and the like. Architectural blocks for more complex circuits, such as field programmable gate arrays (FPGAs), graphic processing units (GPU), microprocessors, and microcontrollers may be available to users via VDA 200.

Within a (non-)immersive environment, a user may view each block, layer, and section of a VD, such as but not limited to an IC. VDA 200 is enabled to provide the views of devices to existing VR and AR devices, such as but not limited to VR headset 106 and AR eyeglasses 108 of FIG. 1. By providing 3D interactive visual tours of virtualized semiconductor devices, students, engineers, and researches may achieve new insights in the understanding, design and development stages for devices.

Various simulation models may be employed by VDA to simulate the physics and/or chemistry of any generated VD. In addition to simulations, the various embodiments may employ and auto-design a full symbolic representation of a VD, such as a transistor, where all of the building blocks from the initial composition materials to its final packaging, are virtualized and visualized within a (non-)immersive environment.

As discussed throughout, based on libraries and databases, VDA 200 enables the generation and display of VDs, such as diodes, transistors, and IC, within (non-)immersive environments. The visualizations of a VD are multidimensional and multilayered. The user may interact with the VD. In various embodiments, a user may manually draw, assemble, design, and layout a VD. The transaction between the views is seamless and intuitive. Via embodiments of the '789 application, additional information may be integrated with the VD.

VDA 200 includes a user interface (UI) engine 210, a VD engine 220, and a VD publishing/marketing/sales engine 270. Briefly, UI engine 210 enables input document collection, user selections, and user-platform interactions. The UI may employ various design libraries and databases, as well as links to custom animations. VD engine 220 provide the multilayered and multidimensional models and simulations of a VD based on the libraries and databases. VD engine 220 may employ various application programming interface (APIs) calls to third-party platforms to enable some of the capabilities, such as automated-design, -test and -marketing. For instance, new ASIC designs may be automatically generated and virtualized from behavioral models or simple circuit descriptions in Natural-Language that may be translated to Register-Transfer Level (RTL) description languages and the like. Such capabilities are empowered by AI/ML techniques and may improve with the tool's maturity. VD publishing engine may publish and/or provide a VD to users.

More specifically, UI engine 210 includes a device editor interface 212, a device database and library interface 214, a computation and reference interface 216, and a configuration interface 218. Device editor interface 212 enables a user to draw and/or edit inputs to VDA 200. For instance, a user may draw a device via device editor interface 212. Likewise, a user may edit design, layout, and simulation files via device editor interface 212. The user may generate, update, and/or link to various device and database libraries via device database and library interface 214. The user may employ various computational and reference engines via computation and reference interface 216. For instance, a user may incorporate data into their VD via various online physics and chemistry references. Additionally, the user may access online computations engines or platforms via computation and reference interface 216. The user may configure their preferences via configuration interface 218. For example, a user may configure their preferred language and display preferences via configuration interface. The user may configure the VD visualization and its layering via configuration interface 218.

VD engine 220 includes a VD data collector 230, a VD data analyzer 240, and a VD generator 260. Briefly, the VD data collector 230 collects input information, such as but not limited to online documents and any documents provided by device editor interface 212 regarding the generation and simulation of the VD. Information collected by VD data collector may include any drawing files, as well as, but not limited to, design, test, layout, and simulation configuration files. Information collected by VD data collector 230 may include information regarding the fabrication and design steps of an IC, diffusion layers, information regarding the junction and terminals of an IC. Other information collected by VD data collector 230 may include the thickness, width, and length of any structures of a VD, process recipes, materials, such as semiconductor materials, physical and chemical reactions, and the like. VD data analyzer 240 generally analyzes the data collected by VD data collector 230. VD generator 260 is generally responsible for generating a VD based on the analysis of VD data analyzer 240.

More specifically, VD data collector 230 includes a VD data learner 232, a VD data organizer 234, and a documentary content generator 236. VD data learner 232 collects, gathers, and learns information about a device to be virtualized. VD data learner 232 may employ machine learning technologies or methods to gather and learn information about a device. For instance, VD data learner 232 may employ deep learned neural networks to learn about a device. VD data learner 232 may access and/or retrieve information about a device from online resources, such as online encyclopedias, databases, online courses, online textbooks, online journals, and the like. The machine learning portions of VD data learner 232 may process the gathered information to synthesize new understanding. For instance, VD data learner 232 may learn and develop expertise in the design, processing, and layout for various semiconductor devices. In some embodiments, VD data learner 232 may identify online documents, extract the information included in the online documents, and interpret the information. VD data learner 232 may employ various embodiments discussed in the '789 application to identify, extract, and organize information.

VD data organizer 234 is generally responsible for organizing and partitioning the information learned by VD data learner 232. For instance, the layers of a device may be determined by VD data organizer 234. The layered information may enable the multi-dimensional and multi-layered virtualization and visualization of a device. The physical layers of a device may be determined by VD data organizer 234. Device information may be organized based on the materials, device regions, electrical contacts, layout layers, device schematics, and device schematics by the VD data organizer 234. Documentary content generator 236 may generate interactive content that documents the device. In various embodiments, documentary content generator 236 may include similar functionality to a documentary generation application (DGA), such as but not limited to DGA 120 of FIG. 1 of the '789 application or DGA 200 of FIG. 2 of the '789 application. Accordingly, documentary content generator 236 may employ any of the various embodiments discussed in conjunction with the '789 application. For instance, documentary content generator 236 may generate an interactive content document regarding the VD.

VD data analyzer 240 is generally responsible for analyzing the information gathered, interpreted learned, organized, and partitioned by VD data collector 230. To enable the analysis of the information, VD data analyzer 240 may include any of a VD database/library component 242, a drawing component 244, a computer aided design (CAD) and animation model component 246, a VD compiler component 248, a natural language (NL) translation component 250, a user interaction component 252, a computation component 254, a cross reference component 256, and a VR and/or AR analyzer 258.

VD drawing component 244 is generally responsible for translating user drawings of devices to be virtualized into scripts or machine code. For instance, drawing component 244 may analyze device drawings provided by device editor interface 212 to generate scripting or machine code files. NL translation component 250 may translate the natural language of any document processed by VD data collector 230 into the user's preferred natural language. User interaction component 252 may handle any user interactions with a VD, through UI engine 210. Computation component 254 may provide computations for the simulations of the physics of a VD. Cross-reference component 256 may receive cross-referenced information about the VD via UI engine 210.

VD database (DB) and library component 242 is generally responsible for preparing machine code for device database and library files. VD DB/library 242 component may assign a keyword or tag to each element of information processed by VD data collector 230. The VD compiler component 248 can employ such keywords or tags. More specifically, VD compiler component 248 can understand and translate such information into device symbols, shapes, wire models, or mathematical formulas. VD compiler component 248 may employ these shapes and/or symbols to generate visualizations of the VD. For instance, VD compiler component 248 may generate visualization of a transistor or a circuit based on the compiled symbols. VD data may be automatically generated from existing device contents available online or from other tools (spice models, gerber files, and the like). Such automation enables the generation or updating of device databases and/or IC libraries.

CAD/Animation model component 246 may generate CAD models from the analyzed information of VD data analyzer 240. The CAD models may be at least partially provided by a third party CAD application via API calls. VR/AR analyzer 258 may analyze the information to generate but not limited to virtual reality-type and/or augmented-reality-type visualizations of the device.

VD generator 260 is generally responsible for generating the VD based on the analyzed information of VD analyzer 240. More specifically, VD generator 260 may generate data encoding the VD. For instance, VD generator 260 may generate a VD data structure, such as but not limited to VD data structure of FIG. 3. VD generator 260 may include a VD specifications component 262, a VD physics simulation component 264, a VD testing component 266, and a VR/AR model generator 268. VD specifications component 262 is generally responsible for generating the specification of the VD. For instance, VD specifications component 262 may generate a device datasheet that includes the device specifications. VD physics simulation component 264 is generally responsible for implementing the device's physics models for simulation purposes. VD testing component 266 is generally responsible for testing the various device specifications to insure that the device meets the requirements. That is, VD testing component 266 may test the design of the device. VD testing component 266 may employ the simulations of VD physics simulation component 264. VR/AR model generator 268 generates the virtual reality models and the augmented reality models for the device. The tool may provide automated recommendations for design, layouts, simulations, tests, marketing, sales prices, using AI/ML techniques. The tool may set sharing restrictions on parts of the VD: private or public. For instance, simulation results may be made inaccessible to users without authorizing credentials. For the Radiation-Hardened/Radiation-Tolerant embodiments, radiation-hardening techniques learned by the machine learning components may be made available for some users with authorizing credentials, while users lacking the authorizing credentials may not view information related to the radiation hardening techniques.

A previously discussed, and for confidentiality reasons, a user may choose to make certain proprietary contents (APIs/libraries/databases/documentation) accessible only to a private group that has extra security credentials and protections. Such information may reside, in an encrypted or an unencrypted format, on the servers or data-centers and will be enabled only on restricted sites that have privileged administrative rights or authorizing credentials. The originator of that information will own these contents without extra copies of them to the tool's provider to avoid liability for the customer's contents: the provider will only enable their viewing through a highly secure communication protocol.

VD publishing engine 270 is generally responsible for publishing the generated VD. VD publishing engine 270 includes an online platform component 272, a device datasheet component 274, an application generator 276, and a VR/AR presenter 278. Online platform component 272 is generally responsible for publishing the VD on various online platforms, such as but not limited to social networks. For example, online platform component 272 may provide an online platform with a data structure that encodes the VD. Device datasheet component 274 is generally responsible for publishing a device datasheet of the VD. For example, device datasheet component 274 may publish a device datasheet on various e-commerce or educational online platforms. Application generator 276 generates and publishes mobile and/or desktop applications regarding the VD. Application generator 276 may generate such applications via the embodiments discussed in the '789 application. Such applications may be published in online platforms, such as but not limited to application stores. VR/AR presenter 278 may present the visualizations of the VD within immersive environments, such as but not limited to VR and AR environments Exemplary Virtual Device Application FIG. 3 illustrates an exemplary, but non-limiting, embodiment of a virtual device (VD) data structure 300 that is consistent with the various embodiments presented herein. VD data structure 300 may encode a VD generated by the various embodiments. A VD generator, such as VD generator 260 of FIG. 2, may generate one or more embodiments of VD data structure 300. VD data structure 300 may include virtually any data that encodes a VD. VD data structure 300 may be published via a VD publishing engine, such as but not limited to VD publishing engine 270 of FIG. 2.

In one embodiment, VD data structure 300 includes CAD models 310. CAD models may include any computer aid design models that model the physical layout and/or structures of the encoded VD. CAD models 310 may include multi-dimensional and multi-layered models of the structures, materials, components, contacts, junctions, and the like of the VD. CAD models 310 may include models that are drawn or coded by the user. For instance, a user may employ device editor interface 212 of FIG. 2 to at least partially generate CAD models 310. The CAD models may be obtained via API calls to any third party CAD system. CAD/Animation model component 246 of FIG. 2 may employ CAD models 310 to generate multi-layered and multi-dimensional visualizations of the VD.

VD data structure 300 may include physics models 320. Physics models 320 may include the models that are employed to simulate the physics, chemistry, or any physical interaction of the VD. For instance, physics models 320 may include process modes, biology models, and the like. Physics models 320 may include particle models, device models, semiconductor models, circuit models, or the like. The user may provide and/or edit the physics models 320 via device editor 212 of FIG. 2. Physics models 320 may be obtained via API call to third party simulation systems. VD simulation component 264 may employ physics models 320 to generate simulation results. At least portions of the simulation results may be encoded in animations 340, target documents, 350, VD desktop/mobile applications 360, VD learned models 370, or the like. Because the user may provide, via device editor 212, any physics models of their interest, a generated VD may be simulated via alternative physics models, rather than just those that have been observed.

VR/AR/AVR/MR models 330 encode the data that are employed to provide the multi-layered and multi-dimensional visualizations of the VD in an immersive environment. For instance, VR headset 106, AR eyeglasses 108 of FIG. 1 and/or MR devices may employ VR/AR models 330 to provide the user a (non-)immersive or mixed-reality experience that includes 3D visualizations of the VD. VR/AR model generator 260 of FIG. 2 may generate VR/AR/AVR/MR models 330.

Animations 340 may include any animations of the VD. Animations may include animations of various simulations generated based on physics models 320. Animations 340 may include visualizations of the VD interacting with other VDs. Animations 340 may include twisting, rotating, translating, or otherwise manipulating the VD through free space. Animations 340 may include zooming in and zooming out from the VD. Animations 340 may include peeling away or adding layers to the VD. CAD/Animation model component 246 of FIG. 2 may employ CAD models 310 to generate animations 340.

Target documents 350 may include any interactive content that augments the VD. Target documents 350 may include any information that documents the VD, the physical layout and/or layering of the VD, the physics of the VD, animations or movies of the VD, audio content, textual content, or any auxiliary information regarding the VD. Various embodiments for generating target documents 250 are discussed within the '789 application. Target documents 350 may be generated automatically (programmatically and/or autonomously) by documentary content generator 236 of FIG. 2 or a documentary generation application, such as but not limited to DGA 120 or DGA 200 of FIGS. 1 and 2 of the '789 application. As an example, data sheet specifications and marketing requirements may be automatically updated throughout the vendor design development operation steps and the specification of its competitors released products, to increase its chances of meeting customer requirements and being highly-competitive.

VD desktop/mobile applications 360 may include any desktop, mobile, or web-based applications. Such applications may be generated and published by an application generator, such as application generator 276 of FIG. 2. Various embodiments of generating an application are discussed in conjunction with the '789 application. VD learned models 370 may include any learned or inferred models about the VD. For example, machine-learning techniques may be employed by VD data learner 232 of FIG. 2 to learn or infer concepts regarding the VD. Models may be learned based on the simulations results. For instance, device parameters, I-V curves, or the like may be inferred about the device via simulations. Such learned concepts or parameters may be embedded within VD learned models. Other VD data 380 may include any other information, such as but not limited to metadata, associated with the VD. The user may provide any data regarding the VD to encode within other VD data 380.

Generalized Processes for Generating a Target Document

Processes 400-600 of FIGS. 4-6A will now be discussed. Briefly, processes 400-500 may be employed to generate and publish a virtual device (VD), as discussed in conjunction with the various embodiments herein. Such processes may be implemented, executed, or otherwise performed via a single and/or a combination of computing devices, such as but not limited to user-computing devices of FIG. 1 or computing device 600 of FIG. 6. A virtual device application (VDA), such as but not limited to VDA 120 of FIG. 1 or VDA 200 of FIG. 2 may implement at least portions of processes 400-500.

Figure 4:
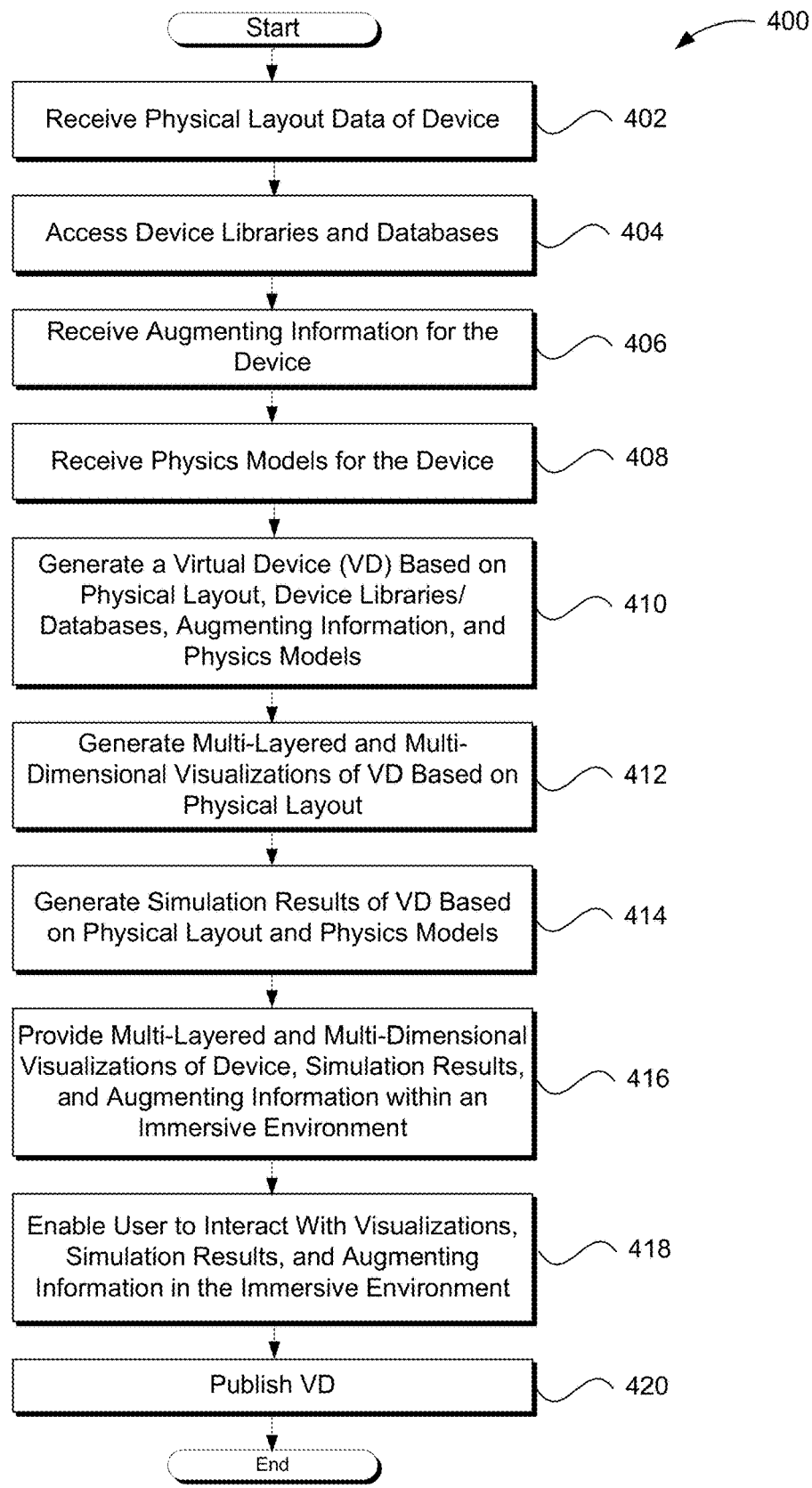
FIG. 4 illustrates one embodiment of a process flow for generating a virtual device that is consistent with the various embodiments presented herein.

FIG. 4 illustrates one embodiment of a process flow for generating a virtual device that is consistent with the various embodiments presented herein. Process 400 begins, after a start block, at block 402 where physical layout data of a physical device is received. At block 404, devices databases and/or libraries for the device are accessed. At block 406, augmenting information for the device is received. For instance, online encyclopedias, textbooks, journal articles about the device, or the like may be received and/or accessed at block 406. At block 408, physics models for the device are received.

At block 410, a VD may be generated based on the physical layout, device libraries/databases, augmenting information, and the physics models. A VD may be encoded in a VD data structure, such as but not limited to VD data structure 300 of FIG. 3. At block 412, multi-layered and multi-dimensional visualizations of the VD may be generated based on the physical layout for the device. At block 414, simulation results are generated based on the physical layout and the physics models. In some embodiments, a user may provide simulation files that define boundary constraints, simulation parameters, or other simulation configurations for the simulations. The simulations and the simulation results may be based on such user(s) input(s). Many users can be collectively working on a single VD, offline or online in real-time.

At block 416, the multi-layered and multi-dimensional visualization of the device, as well as the simulation results and the augmenting information are provided to the user in an immersive environment. As used herein, an immersive environment may include a virtual reality, an augmented reality, an augmented virtual reality and/ore a mixed reality environment. The augmenting information, or at least portions thereof, may be provided to the user in the form of a documenting target document, such as those discussed in the various embodiments of the '789 application. At block 418, the user is enabled to interact with the visualizations, simulation results, and the augmenting information. For instance, the user may rotate the VD within the immersive environment, or add and/or strip away layers from the visualizations. At block 420, the VD may be published. For instance, the VD data structure may be provided to an online social network. In another embodiment, a mobile application for the VD may be published in an online application store.

Figure 5:
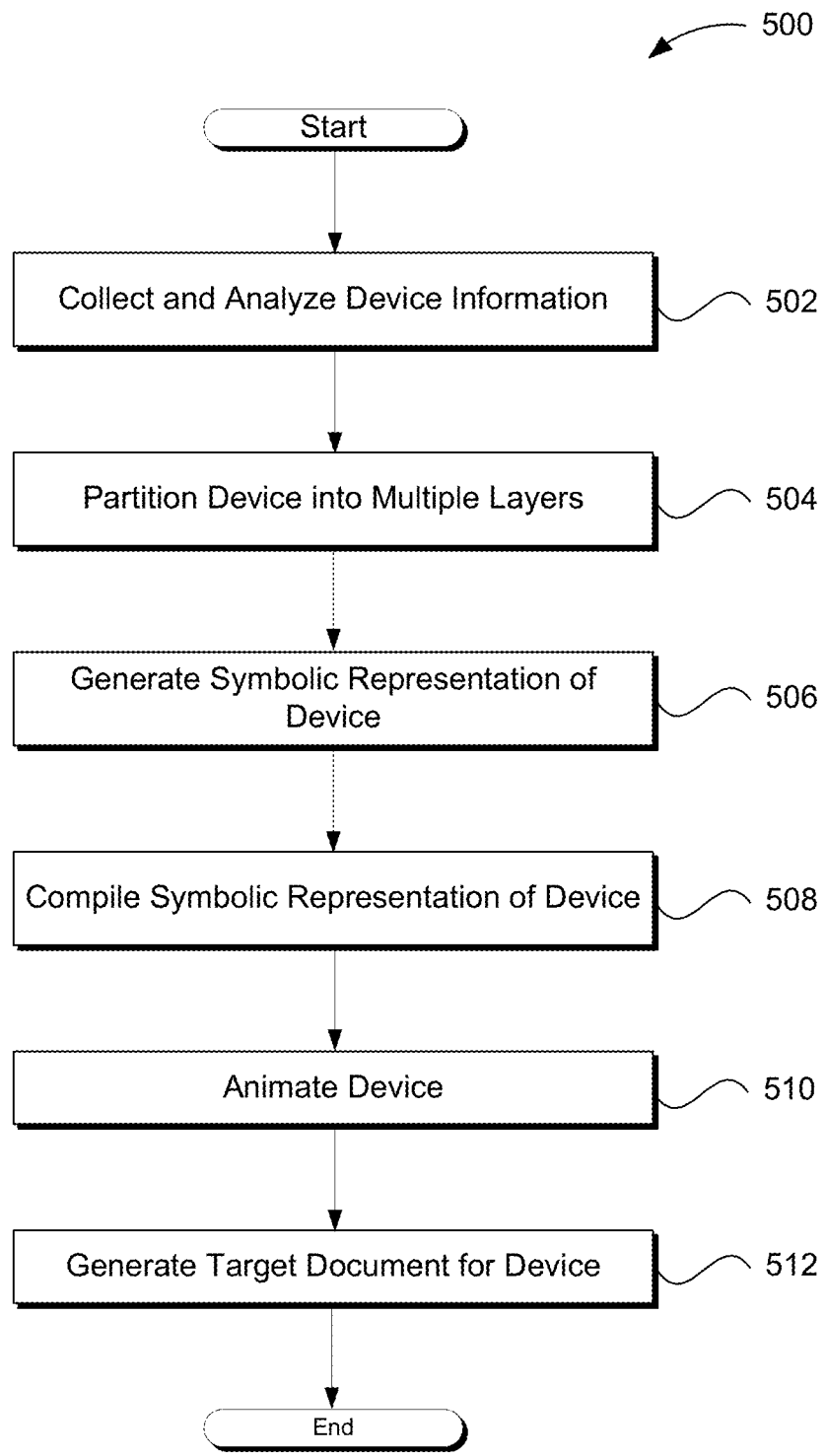
FIG. 5 illustrates one embodiment of another process flow for generating a virtual device that is consistent with the various embodiments presented herein.

FIG. 5 illustrates one embodiment of another process flow for generating a virtual device that is consistent with the various embodiments presented herein. Process 500 begins, after a start block, at block 502 where device information is collected and analyzed. In some embodiments, a VD data collector, such as VD data collector of FIG. 2, may collect, learn, and organize information about the device from one or more online resources. At block 504, the device may be portioned into multiple layers. For instance, the physical layout of the device may be used to define one or more layers of the device. At block 506, a symbolic representation of the device may be generated. At block 508, the symbolic representation of the device may be compiled. At block 510, visualizations of the device may be generated based on the multiple layers of the device. At block 512, a target document for the device may be generated. Various embodiments for generating a target document are discussed within the '789 application.

Figure 6A:
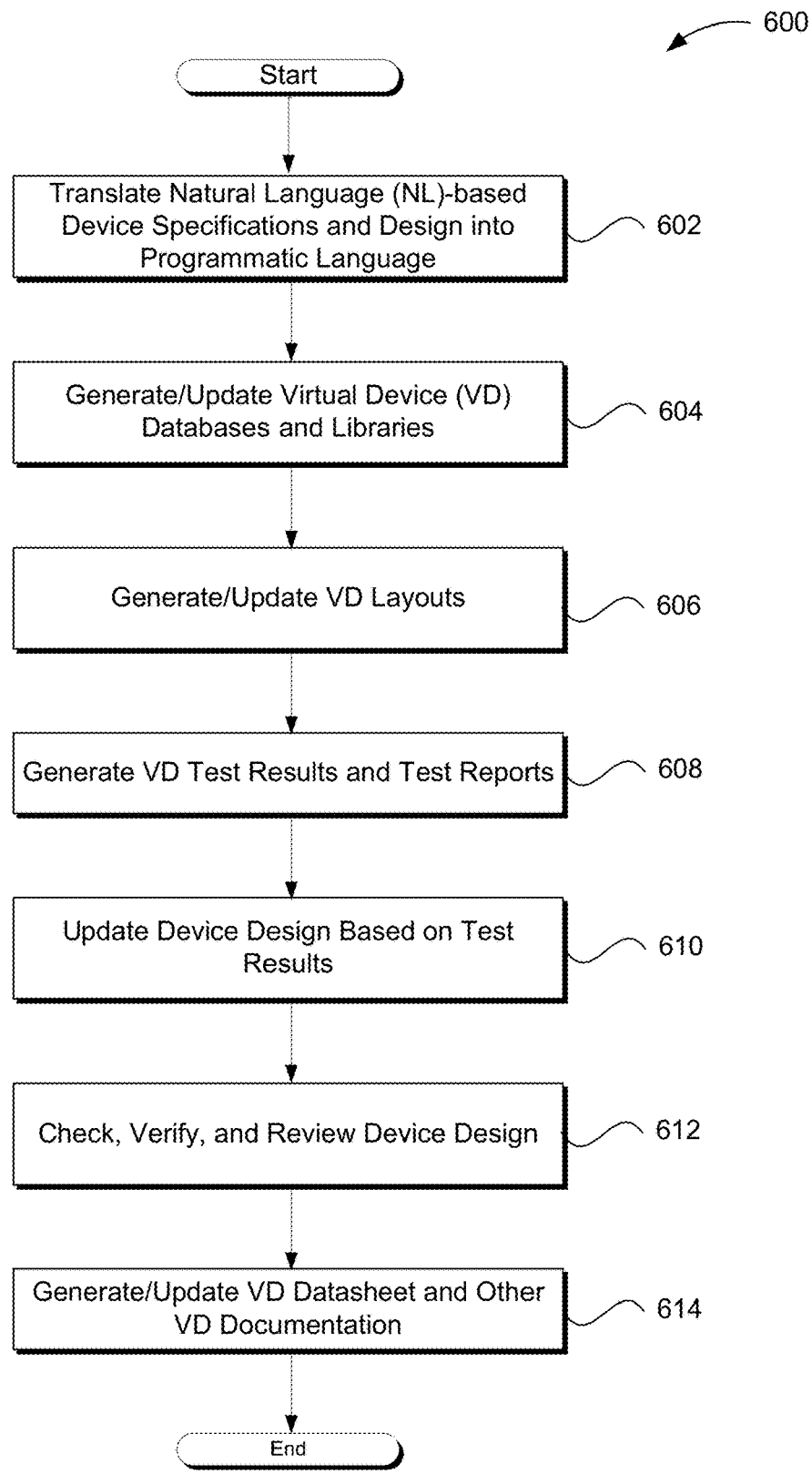
FIG. 6A illustrates one embodiment of still another process flow for generating a virtual device that is consistent with the various embodiments presented herein.

FIG. 6A illustrates one embodiment of still another process flow for generating a virtual device that is consistent with the various embodiments presented herein. Process 600 begins, after a start block, at block 602, where natural language (NL)-based device specifications and designs may be automatically translated into a programmatic language. For instance, NL-based specifications may include text and/or symbols. The automatic translation process may include translations the specifications or design in to a programmatic language, such as but not limited to Hardware Description Language (HDL), or Graphic Database System (GDS).

At block 604, VD database and/or libraries are generated. Their generation and update may be performed automatically (programmatically and/or autonomously). The databases and/or libraries may be based on a combination of collected data from the user specifications, already-stored and/or online libraries/databases and the AI/ML levels of the tool, programmatically and/or autonomously (not necessarily coded but via AI/ML techniques) and/or in a partial or full virtualization manner.

At block 606, VD layouts may be generated and/or updated. Such layouts are not required to be explicitly programmed by the tool, but may be automatically produced by the tool's artificial intelligence and what it has learnt or inferred from prior uses and updated web-information. The resulting VD layout may be the combination of several other VD layouts, in a monolithic (all functionalities are integrated in a single-chip) and/or a hybrid (system-level) manners.

At block 608, VD test results and test reports may be generated and/or updated manually and/or automatically (programmatically and/or autonomously) based on physics models and simulation files. The test results may include tests of the VD, so that the different layers of the VD may be viewed online with the error-propagation. Test results may include calculations of VD Failure-in-Time (FIT), Mean-Time-To-Failure (MTTF), Mean-Time-Between-Failures (MTBF) rates, types and classifications of failures, proposals for failure mitigations solutions, and the like.

At block 610, the device design, or VD design may be updated and/or enhanced based on the test results. In one embodiment, the VD design is updated based on a Built-In-Self-Test (BIST) and/or Built-In-Self-Repair (BISR) techniques. The VD design may be enhanced based on a Fault-Tolerance Technique(s) (FTT). For instance, radiation-hardened designs may be programmatically/autonomously generated from designs intended for commercial use only. Radiation-Hardening by Process/Design/Software and the like techniques at the VD and/or the system levels may be enhanced manually and/or automatically (programmatically/autonomously) continuously and in-line with new technologies developments. The achieved levels of radiation-tolerances may be tuned with the product marketing requirements and be using a combination of a single or multiple FTT solutions. New radiation hardened products may be generated automatically from commercial designs, at and/or starting from the specification, schematics, design, architecture, routing configuration, layout and/or software levels, combining the most suited FTT solutions for the actual device or IC. Updated design mitigation solutions may be performed manually, programmatically and/or autonomously.

The VD design may be enhanced via product marketing and sales information. Such techniques may include major product differentiators at the, but not limited to, technology/design/packaging/high-reliability levels compared to other products, highlights for particular design techniques and the like. For instance, if a new product is released, the tool will automatically search for related public information, run product specs and pricing comparisons and release flags to make the vendor aware of its product's advantages/limitations, compared to the new released products. The user may select to enable or disable automated updates or request to be notified for any new recommended changes to the device at each of its development steps.

At block 612, the VD design may be checked, verified, and/or reviewed. Reviewing and formal-verification of the design may include generation of a review report. The review report may highlight parts of the design that may be susceptible to certain effects, such as radiation effects and provide recommendations but not limiting for their simulations, test and mitigations. Verifying the design may include providing a Failure Analysis (FA) questionnaire for the VD design. The user may respond to a questionnaire to effectively locate the potential areas of susceptibilities in the design and/or potentially damaged parts of the VD due a device-failure. Online with the questionnaire, the VD tool will be visually narrowing down the areas of interest in the device to reduce the amount of device-locations that an FA engineer has to look for. The tool may be showing also potential failure scenarios that may lead to the particular observed failure to help and support the FA engineer in her/his search of the failure root cause.

At block 614, a VD datasheet and other VD documentation may be automatically generated and/or updated. For instance, product marketing, sales data, documentation (datasheets, white papers and the like) and strategies may be generated manually (step by step), programmatically and/or autonomously. VD documentation (from online or already stored data) and multimedia content (movie that can be used for marketing and/or educational purposes and the like) for the VD design may be generated at block 614. Such documentation may include automatically generated, learned, and/or inferred via ML techniques recommendations for other and/or enhanced VD designs or techniques for the design/test/simulation and the like that can perform similar or enhanced VD functions. Each step of processes 400, 500, and 600 may be automated, from design to sales. The automated techniques may be proposed and applied only if approved by the user. The user approval may be requested at every step, once right from the beginning or at the end of the tool usage.

Example Application: Automated Application Specific, Field Programmable, and System on a Chip Design and Virtualization Such design, virtualization and virtualization may employ various ML and/or AI techniques that are reconfigurable and reprogrammable, such as a VD ML/AI reconfigurable and reprogrammable ASIC/FPGA/SoC design that is equipped with manually/automatically (programmatically and/or autonomously) selectable DSP/ML/AI/FTT/Test/Design/Simulation and/or special functions IPs and the like. For instance, test IPs are IPs that allow the test of the VD itself (called in this case BIST IPs) and/or external VDs (other Device-Under Test (DUTs)). For instance, if the VD is configured or designed to operate as a tester, the IPs may be selected to test the VD itself or other VDs operational functions and may run simultaneously on the same and/or another platform in-line with the VD design. The tester design may be added to VD as BIST or remain external as a stimulus or a test bench generator.

Furthermore, if the VD is a designer then it will reconfigure its design with ML IPs that can design and learn how to improve design. In the case of an FPGA, the FPGA will be automatically re-routing itself and partially or totally reconfiguring itself to perform and optimize for these tasks. For instance, if the objective is to design a soft IP processor then the appropriate IPs will be configured and used, while when the objective is to design a high-date-rate memory then the FPGA/ASIC design will be using other ML IPs that are fine-tuned for SRAM designs. In time and throughout the learning process, the VD designer, implemented on an FPGA, an ASIC or other will learn how to use the most suited IPs and improve them for the target design. The added code intelligence and adaptability may minimize the amount of code and circuit design functions and areas to be initially programmed, increase the code-utility, adaptability to new requirements and with its circuit hardware-design capabilities and lifetime. Such improvements may enable and enhance other big and/or highly-dynamic data applications such as Data-Centers, Software-Defined-Radio (SDR), robotics, machinery, e-commerce with large inventories, network communications protocols and hardware and the like.

In the case of an ASIC, parameters or selections of parts of the ASIC design may be changed automatically (programmatically/autonomously). In other words, without initially programming the ASIC design for a given function, the ASIC design by itself equipped with the AI/ML functionalities, will learn other ways of being used and act on it by selecting other parts of its design or changing its own parameters.

In the case of an FPGA, when partially or fully being reconfigured, a number of the FPGA frames may be reconfigured, other parts of the FPGA may be used, parameters of an FPGA design may be changed, and the like. The FPGA will programmatically/automatically fully or partially reconfigure itself in real-time, based on the ML/AI levels of understanding and types of operations. This will allow tremendous flexibility of the result design enabling further highly dynamic and/or big data applications and the like. For instance, hardware equipment may be sold to several countries without major initial programming to target a specific need, but will adapt automatically to its environment (reprogram itself through the cloud or generate its own code to be configured in parts of its hardware design), using geographic locations, language, facial, voice, image, text recognitions, and the like. This will optimize hardware utilizations, increase their longevities and make the hardware equipment more personal and optimize it to the user Example Application: Automated/Autonomous Radiation Effects Design, Simulation, Testing, and Virtualization The tool may be used to design, simulate, and test various specialized devices, such as but not limited to radiation-hardened microelectronics. As such, various embodiments of the tool enables the automated virtualization of radiation effects on devices & ICs themselves being presented in Virtual & Augmented Reality (VAR) views. The displayed radiation effect (the initial ion hit, its interaction with the device materials and its diffusion in and between the device (s) regions) will be viewed in a device or an IC from every angle in a multidimensional (MD) & multilayered (ML) manner, as if it is occurring in real-time. Although conventional tools may show 3D representations of Single Event Effects (SEE) in various device structures, the enhanced embodiments herein provide a full virtualization of the SEE on a semiconductor device or IC. In contrast to conventional tools, the embodiments here provide a fully automated combination & reorganization of the most relevant device and radiation scientific literatures in a single VAR view that is well representative of the device and the radiation effect on its sensitive regions, as well as additional capabilities to automatically provide recommendations for the most suitable radiation characterization, mitigation and qualification techniques as well as marketing strategies.

As discussed throughout the tool enables efficient multi-layered (ML) and multi-dimensional (MD) virtualization of a wide variety of device technologies, with the ability to zoom in and out of levels of hierarchy to obtain additional details at each level. The sharing of the added information can be limited to a select-group that is approved by the provider or intended for public distribution, meaning with whoever is licensed to use this tool. The tool includes mechanisms so the information provider can select its settings with the needed security levels, restrictions and administrative rights.

Various versions of the tool, such as a radiation hardened/radiation tolerant (RH/RT) version, displays radiation effects on the already virtualized devices & circuits. While non-RH/RT versions displaying only commercial transistors and ICs with no demonstration nor virtualization of the radiation effects on them. The RH/RT versions enable the virtualization of the most-known radiation effects on a few target devices (CMOS (PMOS, NMOS), Bipolar (NPN, PNP)). Such simulated and displayable radiation effects include, but are not limited to Enhanced Low-Dose-Rate Sensitivity (ELDRS) to show the variability of the total ionizing dose (TID) effects with the applied radiation dose-rates mainly on bipolar devices. Other virtualizable radiation effects include Single Event Effects (SEE) under heavy-ions, protons, and neutrons, Prompt-Dose Effects (PDE), and Displacement Damage Defects (DDD). Still other virtualizable radiation effects include Single Event Latchup (SEL), Single Event Upset (SEU), Multiple Bit Upset (MBU), Single Event Transient (SET), Multiple Event Transient (MET), Single Event Gate Rupture (SEGR), Single Event Dielectric Rupture (SEDR), and Single Event Burnout (SEB). The RH/RT versions of the tool may include various radiation effects libraries and/or databases that may be native to the tool, or accessed via the cloud-based technologies. The RH/RT version of the tool provides a wealth of science data and information that are essential to the understanding of the aerospace semiconductor industry and radiation effects.

RH/RT versions of the tool may also include various automated and autonomous reverse-engineering techniques to extract and re-create the original design from their layout or netlist representations before automatically creating its RH and/or RT version. Such techniques enable automated RH/RT design creation of a device or IC at any stage of its design (process, schematics, layout or the like), such as its layout representation (in GDS or gerber file formats), netlists or the like. They also allow the interpretation, identification, extraction or implementation of any design mitigation and/or test technique such as BIST/FTT techniques at any design-stage, such as the layout level. Layout mitigation techniques may include guard-rings for latchup mitigation, circle-gates for TID mitigation, redundancy for SEU mitigation, SET filtering techniques, etc. Once mitigation techniques are identified, they are highlighted and the user is notified of their existence. Reverse engineering techniques are also useful to automatically decode a circuit-design from any design abstraction-layer to another, for instance from layout or netlist to schematics at the transistor level. This may be extremely valuable for old designs to resolve obsolescence issues in semiconductor engineering.

Other Example Embodiments

The integrated solution tracking device or tinker-bell (projector/LIDAR/RADAR/Main-Ctrl/camera/sensor(s)) is mobile, which means it has legs and can follow us wherever we go. If you have many of them around us, we can acquire the 360 degrees view and create true MR light-borders to limit and control the propagation of VD to other spaces. Tinker-bell can climb walls and go through walls/spaces in smart homes. We can control it by touch/gestures/voice-commands/etc. as described above or through a smart device (SD) with touch or voice commands. SD in our hands or integrated in the tracking devices/tinker-bells.

Various other embodiments includes a Headset (airpod)/Glasses to Headset (airpod)/Glasses (no phone necessarily involved), multiple people can conference in or see the same things. For wireless phone headset (airpod with integrated LTE, no need for the cell-phone), communicate with tinker-bell and/or Alexa/Google-home/SiRi (for instructions, dial-in, who's calling, who to call, increase/decrease volume, etc.), miniaturize to insert in human body, drive presentations/talks/other devices (appleTV, Mac, Mobile device, etc.) (back and forth), wireless personal headset/speaker. AirPods with visual projection for phone calls. Tinker Bell(s) can show the person(s) calling with their integrated screen(s) and projector. The calling person can be projected in MR environment and/or shown in the Tinker-bell itself (that is shaped for instance in a spherical form). Tinker-Bell may extend its adjustable screen if requested by the user. Tinker-bell can be nowadays computer: visually project keyboard, virtual mouse, extend its wings (black-physical screen) to display virtual monitor, can deploy when needed, be a flying-tablet, and dock when done.

Self-Latchup circuitry for auto-self destroy when the part is badly used (counterfeit), the DNA of the part can be programmed from one manufacturer to another throughout the lifetime of that part. If the part is wrongly used then the part may send alert message (GPS signal), and possibly auto-destroy, etc.

Virtual hardware: virtual keyboard, virtual mouse, virtual screen and virtual hard disk unit. We all communicate through a central unit similar to data-center/cloud. We can travel light and better. We can start with virtual HW disk unit. Devices will learn easily how to adapt to our culture, gestures, dialect, expression, lifestyle, etc., as they communicate directly with the local data-center, which will mean less reprogrammability/reconfigurability/learning steps and HW real-state to adjust to new environments needs.

Companion robot similar to tinker bell but physically stronger (for heavy-duty actions) that translates all of our requests to actions. This is the intermediate solution till we can understand and integrate our biology with our companion-robot(s) to become one physically and/or mentally. We can also have a Cleaning-man/lady robot that can attach to home anywhere, climb walls, clean and adapt to and map our house. The cleaning-man will be able to clean faster and better than us and will know all details about our house more than us, will sense all of our needs and process our requests with and/or without us asking for it.

Wireless power supplies/stations (pumping power from one power-supply stage to another similar to charge pumps), self-generation power supply using power-igniters.

The foldable HW/spaces are self cleaning, maintained, adjusted, upgraded, repaired, etc., simply autonomous. Furniture can be created from walls and/or be delivered through open-spaces that open specifically to accommodate any size of furniture. Walls can be folded to allow any new changes, other object entry, etc.

Autonomous, self-designed, self-cleaned, self-maintained, self-equipped/Adjustable, Foldable Cities/shopping-centers/restaurants/Spaces/Houses/Furniture/anything/etc. on demand: Foldable furniture, foldable utilities (washer/dryer/etc.), foldable adjustable house that can auto-build itself per requested design. Propose new designs through VD invention. If we like the VD then the house can be made to order from vendor or from our adjustable house (logo house), we can adjust to the land space, request other land-space, etc. Houses can be built and routed as FPGAs (piping, walls, furniture). Tinker bells will be inspecting and monitoring the house, the habitants (elders, etc.) constantly VDs can be requested for viewing purposes first. If approved by the user then they will be adopted and the house can be routed as desired. If not then the house can be recycled and/or be rebuilt again. Living rooms can be bedrooms, dining rooms transformed to bathrooms, toilets are foldable, hung into wall and pulled when needed. Vanity can be on top of bathtub, etc. All in 3D and printed in real-time before our eyes. All can be reshaped and re-adjusted as we need it to be. Sensors/cameras/HW electronics placed as needed, recycled if we need to change it and rebuild again. Tinker bells can fill the roles of electricity on our home, with one docking station to which they run for charging. Tinker bell can drive construction, architect the house design, monitor and supervise the construction project by sending the right commands to the pipes to route as planned, walls, floors to cover them, skylights to open/close, etc. They can be the light at night, lusters with changing shapes and/or colors, our computers during the day, our television, microwave, so no electricity is routed at home, only docking stations and flying tinker bells. They may follow us to lighten our way and appear when needed, etc. House can be built from the same material as the pipes and the furniture, be artificially colored, reshaped, demolished, rebuilt, (re-)adjusted to serve our purpose instantly. Foldable chairs/tables will appear as needed from the floor to build restaurant sitting-rooms, shipping centers food courts, etc.

5. Every computer job or other can be and will be automated in time.

6. Shielding Suit for health concerns, light blockers/Smart-suit as a wearable device 7. MR progressive adjustable smart glasses/screens that can detach form us.

8. Front/back cameras in SD devices: Using front cameras for multi-touch commands, front camera to project us in VD, back-camera to project VD to others.

9. Cameras will analyze images in real-time and differentiate between reality and virtual reality to predict movements and gestures.

10. Establish boundaries in app, so one human being/object cannot be superposed on another, unless that is what they want, such as in the case where we are trying clothes.

11. Freedom from all physical attachments, same way as in reality

12. App to synchronize, images, VDs, voices, gestures, movements, etc. and instruments in real time. Solution less invasive and less cumbersome, more adaptable, portable and upgradable.

13. Have to have enough camera coverage and digital resolution to cover movement, sensor to do the rest of covered area (hidden to camera). If camera cannot see your hidden hand the hand gloves equipped with sensors can do the rest.

The embodiments may include

1. Condensation of Semi-conductor engineering, all of our science and know-how in a single/multiple platform (CAD design, builder, designer), etc.
2. Reverse engineering to interpret/understand/recycle/rebuild
3. MR world to connect whenever and wherever
4. Camera/projector/radars/etc. fast sampling and motion, etc.
5. Autonomous automated smart-jobs (cleaning-man, please)
6. Electro-magnetic VDs outside of our smart-devices and moving freely in our world
7. Devices integrated-Cameras can identify/recognize objects/faces/body/shapes/etc. in real-time and re-project them with or without our virtual environment.
8. Every object in a house (walls, furniture, etc.) can be designed virtually and in reality.
9. Two LIDARs/light-emitters can cancel each other to mark the physical point and limit the VD view.
10. Central unit to project keyboard, mouse, screen, which can evolve entirely to virtual desktop that is wirelessly connected to servers, data-centers. We can rent the time. Less HW. Virtuality and Cloud (private, hybrid, public) may be the future of computers.

Tinker-bells can fly, dock, clean and do many other tasks, in time. They can transport, think together, ship, deliver, follow the user wherever she/he goes, etc.

The foldable spaces are self cleaning, maintained, adjusted, upgraded, repaired, etc., simply autonomous. Furniture can be created from walls or be delivered through open-spaces that open specifically to accommodate any size of furniture. Walls can be folded to allow any new changes, other object entry, etc.

Wireless autonomous weapons, disabled if fired wrongly or in case of danger to innocents. For any wrongful attack, weapons are automatically disabled. Autonomous weapons can fly as drones.

Police shield to protect and disable others of they are a danger to us.

Illustrative Computing Device

Figure 7:
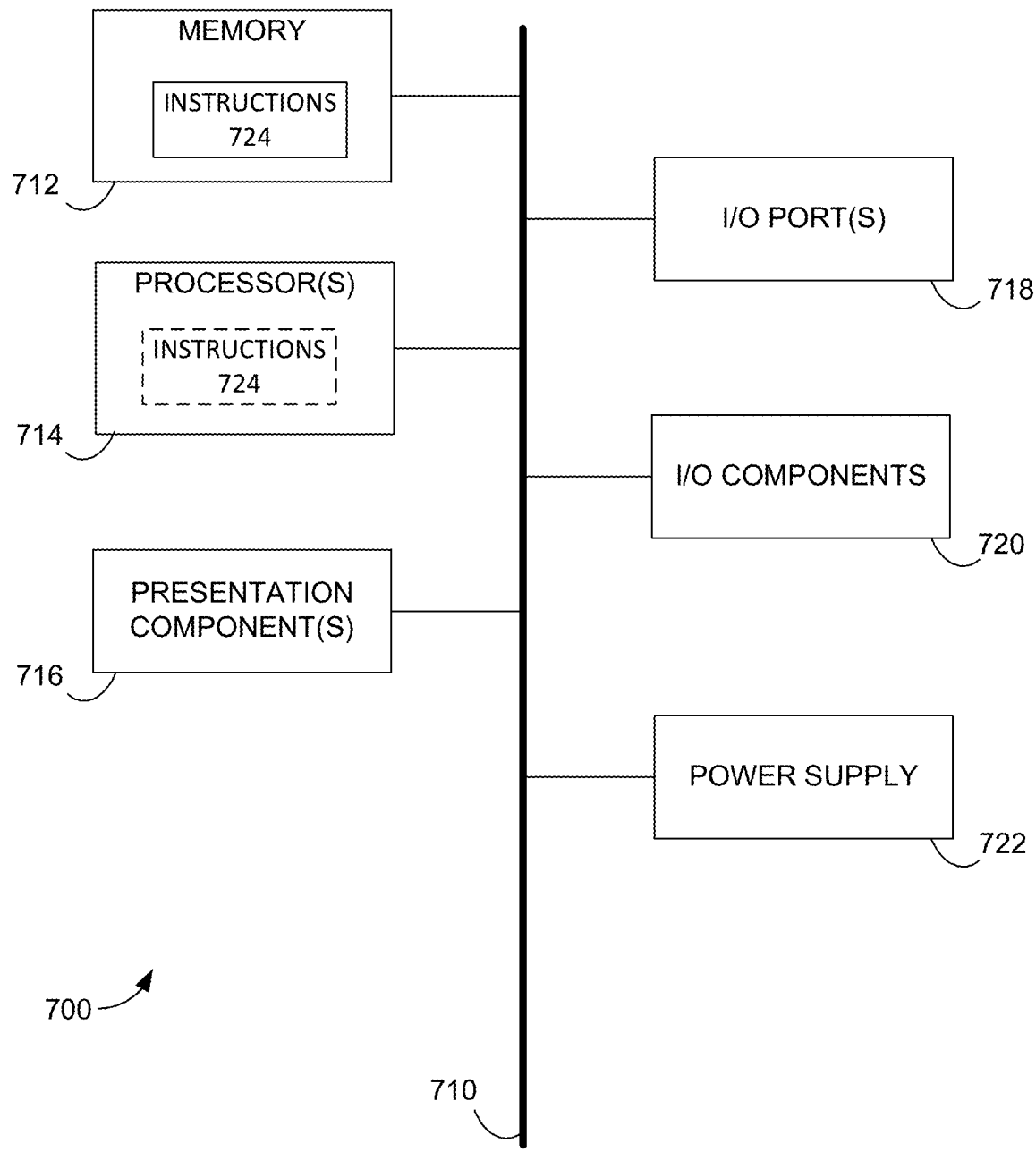
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above-discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects herein above set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations do not need to be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)"

What is claimed is:

1. One or more non-transitory computer-readable storage media having instructions stored thereon, which, when executed by one or more processors of a computing device cause the computing device to perform actions comprising:
   receiving one or more documents, wherein at least one of the received documents includes descriptive information indicating a physical layout of an object;
   accessing a library associated with the object, documentation in the library being updated with new information regarding the object when the new information is received;
   portioning the object into one or more portions of the object based in part on the physical layout of the object;
   manipulating at least one of the portions of the object based in part on the library associated with the object;
   generating a virtual object based on the physical layout of the object, the portions of the object and the library associated with the object, the virtual object including a representation of the object in a two or more dimensional view;
   generating a visualization of the virtual object; and
   providing the visualization of the virtual object within a non-immersive environment or an immersive environment, the immersive environment including one of a virtual-reality (VR) environment, an augmented VR environment, an augmented-reality (AR) environment and a mixed-reality environment.

2. The one or more computer-readable storage media of claim 1, wherein the actions further comprise:
   receiving augmenting information associated with the object;
   generating a target document for the virtual object based on the augmenting information; and
   providing at least a portion of the target document within the non-immersive or the immersive environment.

3. The one or more computer-readable storage media of claim 2, wherein the actions further comprise:
   receiving a physics model for the object;
   receiving a simulation file that includes one or more simulation parameters for the object; and
   generating simulation results for the virtual object based on the physics model and the simulation file.

4. The one or more computer-readable storage media of claim 3, wherein the actions further comprise:
generating a mobile application based on the simulation results: and
publishing the mobile application on an online platform.

5. The one or more computer-readable storage media of claim 1, wherein the visualization of the virtual object is a multi-layered and a multi-dimensional visualization.

6. The one or more computer-readable storage media of claim 1, wherein the actions further comprise:
generating a device model of the object based at least in part on the descriptive information; and
generating the physical layout of the object based at least in part on the device model.

7. The one or more computer-readable storage media of claim 1, wherein the object is one of a diode, transistor, or an integrated circuit.

8. A method comprising:
receiving one or more documents, wherein at least one of the received documents includes descriptive information indicating a physical layout of an object;
accessing a library associated with the object, documentation in the library being updated with new information regarding the object when the new information is received;
portioning the object into one or more portions of the object based in part on the physical layout of the object;
manipulating at least one of the portions of the object based in part on the library associated with the object;
generating a virtual object based on the physical layout of the object, the portions of the object and the library associated with the object, the virtual object including a representation of the object in a two or more dimensional view;
generating a visualization of the virtual object; and
providing the visualization of the virtual object within a non-immersive environment or an immersive environment, the immersive environment including one of a virtual-reality (VR) environment, an augmented VR environment, an augmented-reality (AR) environment and a mixed-reality environment.

9. The method of claim 8, further comprising:
receiving augmenting information associated with the object;
generating a target document for the virtual object based on the augmenting information; and
providing at least a portion of the target document within the non-immersive or the immersive environment.

10. The method of claim 8, further comprising:
receiving a physics model for the object;
receiving a simulation file that includes one or more simulation parameters for the object; and
generating simulation results for the virtual object based on the physics model and the simulation file.

11. The method of claim 8, further comprising:
generating a mobile application based on the simulation results; and
publishing the mobile application on an online platform.

12. The method of claim 8, wherein the object is one of a diode, transistor, or an integrated circuit.

13. The method of claim 8, further comprising generating the library based at least in part on the one or more documents.

14. The method of claim 8, wherein the visualization of the virtual object is a multi-layered and a multi-dimensional visualization.

15. A computing system for generating a documentary of a source document comprising:
a processor; and
a computer-readable storage medium, coupled with the processor, having instructions stored thereon, which, when executed by the processor, execute actions comprising:
receiving one or more documents, wherein at least one of the received documents includes descriptive information indicating a physical layout of an object;
accessing a library associated with the object, documentation in the library being updated with new information regarding the object when the new information is received;
portioning the object into one or more portions of the object based in part on the physical layout of the object;
manipulating at least one of the portions of the object based in part on the library associated with the object;
generating a virtual object based on the physical layout of the object, the portions of the object and the library associated with the object, the virtual object including a representation of the object in a two or more dimensional view;
generating a visualization of the virtual object; and
providing the visualization of the virtual object within a non-immersive environment or an immersive environment, the immersive environment including one of a virtual-reality (VR) environment, an augmented VR environment, an augmented-reality (AR) environment and a mixed-reality environment.

16. The computing system of claim 15, wherein the actions further comprise:
receiving augmenting information associated with the object;
generating a target document for the virtual object based on the augmenting information; and
providing at least a portion of the target document within the non-immersive or the immersive environment.

17. The computing system of claim 15, wherein the actions further comprise:
receiving a physics model for the object;
receiving a simulation file that includes one or more simulation parameters for the object; and
generating simulation results for the virtual object based on the physics model and the simulation file.

18. The computing system of claim 15, wherein the actions further comprise:
generating a mobile application based on the simulation results; and
publishing the mobile application on an online platform.

19. The computing system of claim 15, wherein the object is one of a diode, transistor, or an integrated circuit.

20. The computing system of claim 15, wherein the descriptive information includes one or more of image, text, drawing and speech.

* * * * *